(12) United States Patent
Logan et al.

(10) Patent No.: US 9,909,369 B2
(45) Date of Patent: *Mar. 6, 2018

(54) ELECTROMAGNETIC TELEMETRY GAP SUB ASSEMBLY WITH INSULATING COLLAR

(71) Applicant: EVOLUTION ENGINEERING INC., Calgary (CA)

(72) Inventors: Aaron W. Logan, Calgary (CA); Daniel W. Ahmoye, Calgary (CA); David A. Switzer, Calgary (CA); Justin C. Logan, Calgary (CA); Patrick R. Derkacz, Calgary (CA); Mojtaba Kazemi Miraki, Calgary (CA)

(73) Assignee: Evolution Engineering Inc., Calgary (CA)

( * ) Notice: Subject to any disclaimer, the term of this patent is extended or adjusted under 35 U.S.C. 154(b) by 391 days.

This patent is subject to a terminal disclaimer.

(21) Appl. No.: 14/443,173

(22) PCT Filed: Nov. 15, 2013

(86) PCT No.: PCT/CA2013/050877
§ 371 (c)(1),
(2) Date: May 15, 2015

(87) PCT Pub. No.: WO2014/075190
PCT Pub. Date: May 22, 2014

(65) Prior Publication Data
US 2015/0330155 A1   Nov. 19, 2015

Related U.S. Application Data

(60) Provisional application No. 61/727,610, filed on Nov. 16, 2012, provisional application No. 61/767,759, filed on Feb. 21, 2013.

(51) Int. Cl.
*E21B 17/00* (2006.01)
*E21B 17/02* (2006.01)
(Continued)

(52) U.S. Cl.
CPC .......... *E21B 17/028* (2013.01); *E21B 17/003* (2013.01); *E21B 17/042* (2013.01);
(Continued)

(58) Field of Classification Search
CPC ................................... E21B 17/028
See application file for complete search history.

(56) References Cited

U.S. PATENT DOCUMENTS 3,323,327 A    6/1967  Leathers et al.
4,176,894 A   12/1979  Godbey
(Continued)

FOREIGN PATENT DOCUMENTS

CN      1975106 A      6/2007
WO    03004826 A1      1/2003
(Continued)

*Primary Examiner* — John J Kreck
(74) *Attorney, Agent, or Firm* — Oyen Wiggs Green & Mutala LLP

(57) ABSTRACT

An insulating collar for a gap sub assembly for electromagnetic (EM) telemetry used in downhole drilling is disclosed. The gap sub assembly comprises a female member comprising a female mating section and a male member comprising a male mating section and a gap section. The male mating section is matingly received within the female mating section and electrically isolated therefrom. The insulating collar is positioned on the gap section. The collar is made up of a framework with a plurality of discrete bodies spaced about the framework and a portion of each of the discrete bodies protrudes above the framework. Either the framework or the discrete bodies are made of an electrical insulator material to electrically isolate one end of the collar (Continued)

from the other end of the collar. The collar therefore electrically isolates the male member from the female member and the male member, female member and insulating collar function as the "gap sub" for EM telemetry.

42 Claims, 22 Drawing Sheets

(51) Int. Cl.
  *E21B 17/042* (2006.01)
  *E21B 17/046* (2006.01)
  *F16L 15/08* (2006.01)
  *F16L 25/02* (2006.01)
(52) U.S. Cl.
  CPC ............ *E21B 17/046* (2013.01); *F16L 15/08* (2013.01); *F16L 25/02* (2013.01); *F16L 25/021* (2013.01); *F16L 2201/40* (2013.01)

(56) References Cited

U.S. PATENT DOCUMENTS

| | | |
|---|---|---|
| 4,348,672 A | 9/1982 | Givler |
| 4,496,174 A | 1/1985 | McDonald et al. |
| 4,684,946 A | 8/1987 | Issenmann |
| 4,739,325 A | 4/1988 | MacLeod |
| 5,130,706 A | 7/1992 | Van Steenwyk |
| 5,138,313 A | 8/1992 | Barrington |
| 5,236,048 A | 8/1993 | Skinner et al. |
| 5,406,983 A | 4/1995 | Chambers et al. |
| 5,467,832 A | 11/1995 | Orban et al. |
| 5,749,605 A | 5/1998 | Hampton, III et al. |
| 5,883,516 A | 3/1999 | Van Steenwyk et al. |
| 6,050,353 A | 4/2000 | Logan et al. |
| 6,098,727 A | 8/2000 | Ringgenberg et al. |
| 6,158,532 A | 12/2000 | Logan et al. |
| 6,404,350 B1 | 6/2002 | Soulier |
| 6,727,827 B1 | 4/2004 | Edwards et al. |
| 6,750,783 B2 | 6/2004 | Rodney |
| 6,926,098 B2 | 8/2005 | Peter |
| 7,151,466 B2 | 12/2006 | Gabelmann et al. |
| 7,243,028 B2 | 7/2007 | Young et al. |
| 7,252,160 B2 | 8/2007 | Dopf et al. |
| 7,255,183 B2 | 8/2007 | Cramer |
| 7,326,015 B2 | 2/2008 | Reynolds, Jr. |
| 7,387,167 B2 | 6/2008 | Fraser et al. |
| 7,477,162 B2 | 1/2009 | Clark |
| 7,573,397 B2 | 8/2009 | Petrovic et al. |
| 7,605,716 B2 | 10/2009 | Peter et al. |
| 7,782,060 B2 | 8/2010 | Clark et al. |
| 7,900,968 B2 | 3/2011 | Camwell et al. |
| 8,154,420 B2 | 4/2012 | Petrovic et al. |
| 8,648,773 B2 | 2/2014 | Dopf et al. |
| 9,670,771 B2 * | 6/2017 | Logan .................. E21B 47/122 |
| 2004/0104047 A1 | 6/2004 | Peter |
| 2006/0202852 A1 | 9/2006 | Peter et al. |
| 2007/0247328 A1 | 10/2007 | Petrovic et al. |
| 2007/0247329 A1 | 10/2007 | Petrovic et al. |
| 2009/0065254 A1 | 3/2009 | Peter |
| 2009/0066334 A1 | 3/2009 | Peter |
| 2009/0091327 A1 | 4/2009 | Blanz |
| 2010/0033344 A1 | 2/2010 | Rozenblit et al. |
| 2011/0254695 A1 | 10/2011 | Camwell et al. |
| 2011/0309949 A1 | 12/2011 | Dopf et al. |
| 2012/0085583 A1 | 4/2012 | Logan et al. |
| 2013/0043874 A1 | 2/2013 | Clark et al. |

FOREIGN PATENT DOCUMENTS

| | | |
|---|---|---|
| WO | 2006083764 A1 | 8/2006 |
| WO | 2009082530 A2 | 7/2009 |
| WO | 2009086637 A1 | 7/2009 |
| WO | 2010121344 A1 | 10/2010 |
| WO | 2010121345 A1 | 10/2010 |
| WO | 2010121346 A1 | 10/2010 |
| WO | 2011049573 A1 | 4/2011 |
| WO | 2011133399 A1 | 10/2011 |
| WO | 2012042499 A2 | 4/2012 |

* cited by examiner

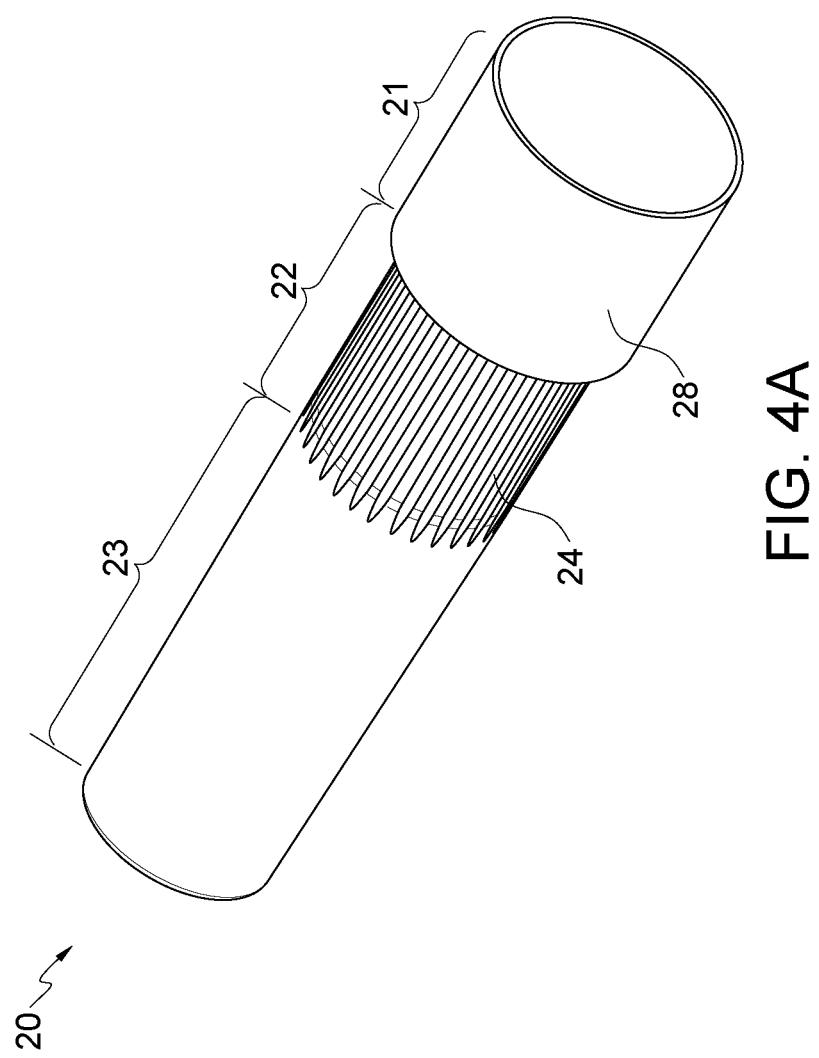

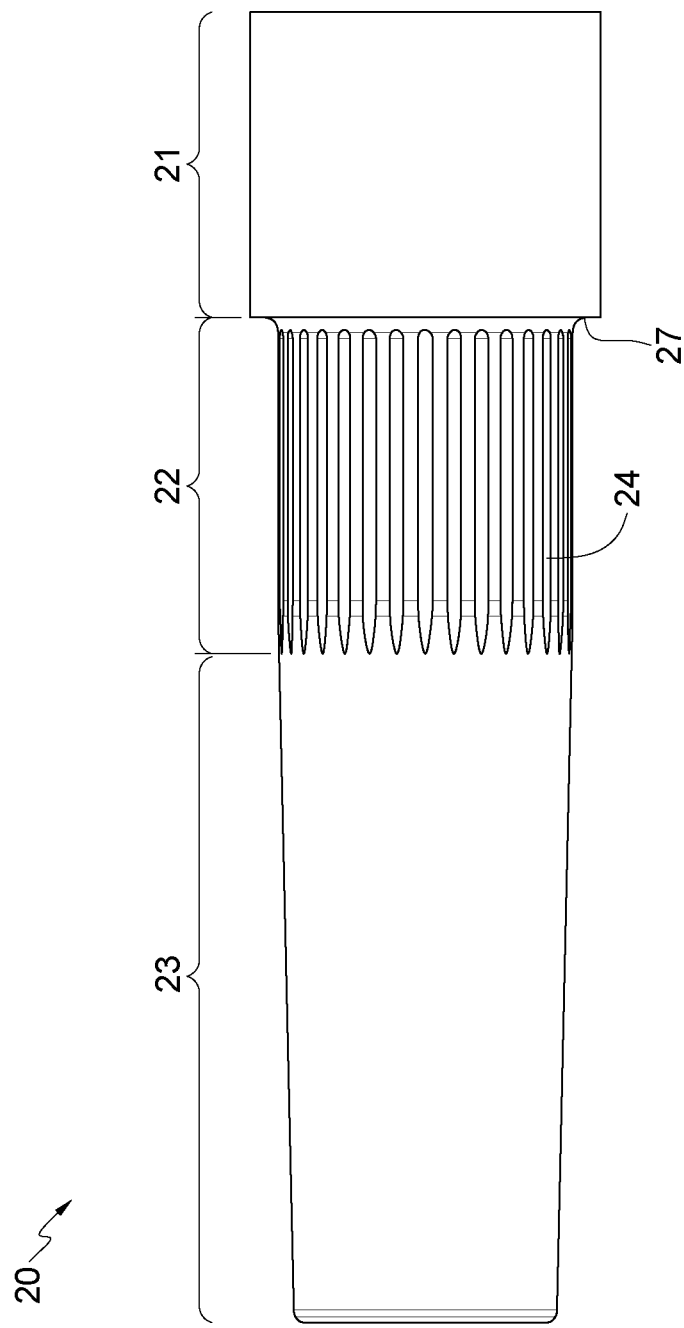

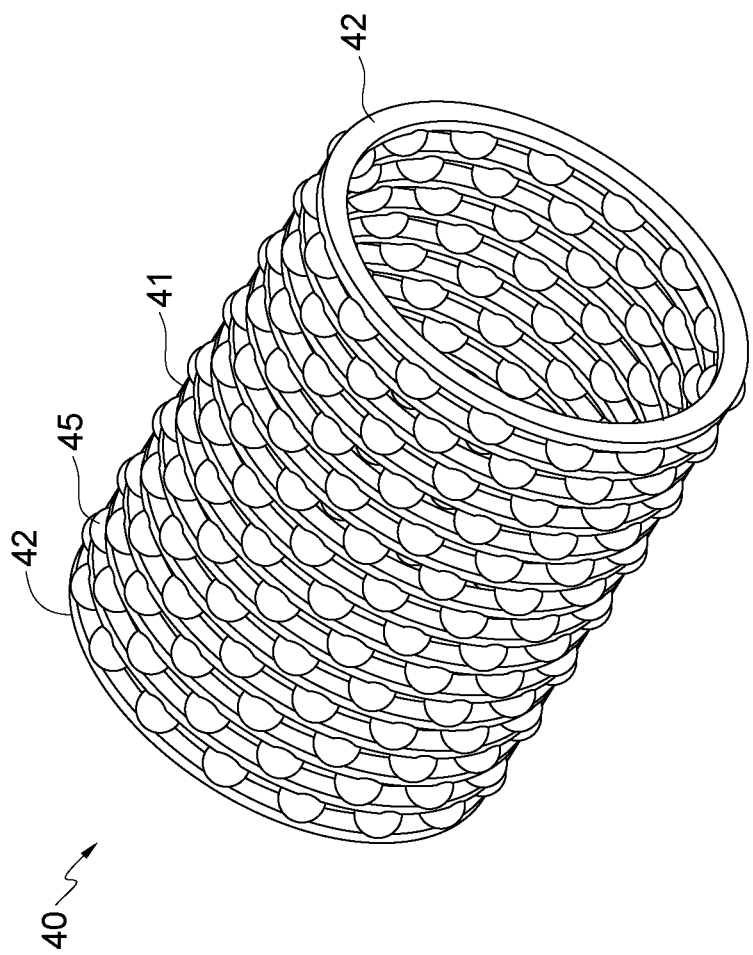

ELECTROMAGNETIC TELEMETRY GAP SUB ASSEMBLY WITH INSULATING COLLAR

REFERENCE TO RELATED APPLICATIONS

This application claims priority from U.S. Application No. 61/727,610 filed 16 Nov. 2012 and U.S. Application No. 61/767,759 filed 21 Feb. 2013. For purposes of the United States, this application claims the benefit under 35 U.S.C. § 119 of U.S. Application No. 61/727,610 filed 16 Nov. 2012 and U.S. Application No. 61/767,759 filed 21 Feb. 2013, both of which are entitled ELECTROMAGNETIC TELEMETRY GAP SUB ASSEMBLY WITH INSULATING COLLAR and which are hereby incorporated herein by reference for all purposes.

FIELD

This disclosure relates generally to gap sub assemblies and electrically-insulating collars for gap sub assemblies. Embodiments provide gap sub assemblies suitable for use in measurement while drilling using electromagnetic telemetry and methods for fabricating gap sub assemblies.

BACKGROUND

The recovery of hydrocarbons from subterranean zones relies on the process of drilling wellbores. This process includes drilling equipment situated at the surface and a drill string extending from the surface equipment to the formation or subterranean zone of interest. The drill string can extend thousands of feet or meters below the surface. The terminal end of the drill string includes a drill bit for drilling, or extending, the wellbore. The process also relies on some sort of drilling fluid system, in most cases a drilling "mud". The mud is pumped through the inside of the drill string, which cools and lubricates the drill bit and then exits out of the drill bit and carries rock cuttings back to surface. The mud also helps control bottom hole pressure and prevents hydrocarbon influx from the formation into the wellbore and potential blow out at the surface.

Directional drilling is the process of steering a well from vertical to intersect a target endpoint or to follow a prescribed path. At the terminal end of the drill string is a bottom hole assembly (BHA) which may include 1) the drill bit; 2) a steerable downhole mud motor of a rotary steerable system; 3) sensors of survey equipment for logging while drilling (LWD) and/or measurement while drilling (MWD) to evaluate downhole conditions as drilling progresses; 4) apparatus for telemetry of data to the surface; and 5) other control equipment such as stabilizers or heavy weight drill collars. The BHA is conveyed into the wellbore by a string of metallic tubulars known as the drill string. MWD equipment may be used to provide downhole sensor and status information at the surface while drilling in a near real-time mode. This information is used by the rig crew to make decisions about controlling and steering the well to optimize the drilling speed and trajectory based on numerous factors, including lease boundaries, existing wells, formation properties, hydrocarbon size and location. These decisions can include making intentional deviations from the planned wellbore path as necessary, based on the information gathered from the downhole sensors during the drilling process. In its ability to obtain real time data, MWD allows for a relatively more economical and efficient drilling operation.

Various telemetry methods may be used to send data from MWD or LWD sensors back to the surface. Such telemetry methods include, but are not limited to, the use of hardwired drill pipe, acoustic telemetry, use of fibre optic cable, mud pulse (MP) telemetry and electromagnetic (EM) telemetry.

EM telemetry involves the generation of electromagnetic waves at the wellbore which travel through the earth's surrounding formations and are detected at the surface.

Advantages of EM telemetry relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no mud flowing. This is advantageous when the drill crew is adding a new section of drill pipe as the EM signal can transmit the directional survey while the drill crew is adding the new pipe.

Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. Higher frequency signals attenuate faster than low frequency signals.

A BHA metallic tubular is generally used as the dipole antennae for an EM telemetry tool by dividing the drill string into two conductive sections by an insulating joint or connector which is known in the art as a "gap sub". One important design aspect of an EM telemetry system is the gap sub. The gap sub must meet electrical isolation requirements as well as withstanding the mechanical loading induced during drilling and the high differential pressures that occur between the center and exterior of the drill pipe. These mechanical loads are typically quite high and most drill string components are made from high strength, ductile metal alloys in order to handle the loading without failure. As most high dielectric materials typically used in gap sub assemblies are either significantly lower strength than metal alloys or highly brittle, the mechanical strength of the gap sub becomes a significant design hurdle. The gap sub tends to be a weaker link in the drill string.

Directional drilling is generally started by drilling a vertical section of wellbore. At some point, the drill is operated so that the wellbore deviates from the vertical forming a curve or 'dogleg'. The trajectory of the wellbore may change rapidly as a curve is formed in the wellbore. Direction changes that occur more rapidly than planned or desired can cause problems. For example, the casing may not fit easily through a too-tightly curved section of the wellbore (sometimes called a micro-dogleg section). Repeated abrasion by the drill string at the dogleg can result in worn spots in which the BHA may become lodged. Excessive doglegs can also increase the overall friction of the drill string, resulting in increased potential for damage of the BHA. Passing around a tight dogleg can cause special problems for a gap sub including the potential for damage and excessive wear of the dielectric is increased. The reduced mechanical strength of a gap sub can cause the gap to act as a flex collar which can cause excessive stress in the gap sub when undergoing bending. Such stress can cause dielectric material in the gap to chip out, crack or buckle due to compressive loading, from wear in the borehole, or from impact with the borehole.

SUMMARY

This invention has a number of aspects. One aspect provides constructions for gap subs. Another aspect provides methods for fabricating gap subs. Another aspect provides gap subs having extended gaps. Another aspect provides components for gap subs. Another aspect provides gap subs having electrically-insulating gaps with electrical conductors extending across the gaps. Another aspect provides electrically-insulating collars for gap subs. There is synergy among different ones of these aspects. However, the aspects also have independent application.

One aspect provides an insulating collar for a gap sub assembly. The collar has a pair of longitudinal ends spaced apart from each other and a bore therethrough. The collar comprises a framework and a plurality of discrete bodies spaced about the framework. A portion of each of the plurality of discrete bodies protrudes above a surface of the framework. The framework and the plurality of discrete bodies extend between the pair of longitudinal ends of the collar and either the framework or the plurality of discrete bodies comprises an electrical insulator material so as to electrically isolate one of the pair of longitudinal ends of the collar from the other of the pair of longitudinal ends of the collar.

The framework may comprise a metal or metal alloy. The plurality of discrete bodies may be spheres.

The framework may comprise one or more than one ring with opposed side faces. The framework may comprise a pair of end rings and some or all of the plurality of discrete bodies are positioned between the end rings. The framework may further comprise one or more than one internal ring positioned between the pair of end rings. At least some of the plurality of discrete bodies are positioned between each of the end rings and the internal ring. The end rings may be thicker than the internal ring.

Each of the pair of end rings may comprise an outer side face and an opposed inner side face with the inner side faces facing each other, each of the inner side faces including a plurality of spaced inner side face end ring surface depressions thereon. Each inner side face end ring surface depression is configured to receive a portion of one of the plurality of discrete bodies therein. The outer side faces of the pair of end rings may include a plurality of spaced outer side face end ring surface depressions thereon. Each outer side face end ring surface depression is configured to receive a portion of one of the plurality of discrete bodies therein. The framework may further comprise one or more than one internal ring positioned between the pair of end rings. The internal ring may comprise two opposed side faces with one of the opposed side faces facing the inner side face of one of the pair of end rings and the other of the opposed side faces facing the inner side face of the other of the pair of end rings, each of the opposed side faces including a plurality of spaced internal ring surface depressions thereon. Each internal ring surface depression is configured to receive a portion of one of the plurality of discrete bodies therein. The internal ring surface depressions of one of the opposed side faces may be offset from the internal ring surface depressions of the other of the opposed side faces. Alternatively, the internal ring surface depressions of one of the opposed side faces may align with the internal ring surface depressions of the other of the opposed side faces.

The framework may comprise a helical spring and at least some of the plurality of discrete bodies are positioned between inner side faces of the helical spring.

The framework may further comprise a dielectric material between the plurality of discrete bodies.

The framework may comprise a sleeve with a plurality of holes therethrough and each of the plurality of holes receives at least a portion of one of the plurality of discrete bodies therethrough.

According to a second aspect of the present disclosure, there is provided a gap sub assembly. The gap sub assembly comprises:
(a) a female member having a female mating section;
(b) a male member having a male mating section and a gap section, the male mating section being inserted into the female mating section whereby the male and female mating sections overlap;
(c) an electrical isolator component located between the overlapping male and female mating sections such that the male and female members are mechanically coupled together but electrically isolated from each other at their mating sections;
(d) an insulating collar according to the first aspect of the present disclosure positioned on the gap section thereby electrically isolating the male member from the female member.

The gap section may be configured to interact with at least part of the protruding portion of the plurality of discrete bodies of the insulating collar to impede rotation of the insulating collar relative to the gap section. The gap section may comprise a plurality of longitudinally extending grooves on an external surface thereof and at least part of the protruding portion of the plurality of discrete bodies is received in one of the plurality of longitudinally extending grooves.

The male member may further comprise a shoulder section including a male annular shoulder. The insulating collar may be positioned between the male annular shoulder and an end of the female mating section defining a female annular shoulder. At least one of the male annular shoulder or the female annular shoulder may comprise a plurality of spaced shoulder surface depressions thereon. Each shoulder surface depression is configured to receive a portion of one of the plurality of discrete bodies therein.

Another aspect provides a gap sub assembly comprising: a first end comprising a first coupling and a second end comprising a second coupling. The first and second ends are attached to and electrically insulated from one another. A reduced-diameter section extends between and connects the first and second ends. A collar extends circumferentially around and along the reduced-diameter section. The collar comprises a plurality of metal rings, the plurality of metal rings are axially spaced apart from one another and radially spaced from the reduced-diameter section by electrically-insulating bodies disposed between adjacent ones of the plurality of rings. A dielectric material fills voids between the metal rings.

Another aspect provides a method for making a gap sub. The method comprises: placing a collar around a tubular gap portion; coupling the gap portion to at least one other part to yield an assembly wherein the collar is located between first and second shoulders; axially compressing the collar; and filling spaces in the collar with a dielectric material.

Another aspect provides a gap sub comprising a male part and a female part having a female mating section configured to receive a mating section of the male part. The mating section of the male part comprises a first plurality of grooves extending in a first direction on a surface of the mating section and a second plurality of grooves extending in a second direction that is non-parallel to the first direction, the mating section of the female part comprises a first plurality of grooves extending in a first direction on a surface of the mating section and a second plurality of grooves extending in a second direction that is non-parallel to the first direction.

Another aspect provides a gap sub comprising a male part comprising a bore having a first inner diameter, a normal section having a first outer diameter, a gap region having a second outer diameter less than the first outer diameter, and a male mating section coupled to a female part comprising a female mating section and a bore. The female mating section is configured to receive the male mating section. An electrically-insulating collar surrounds the gap region of the male part. The gap region is at least 1 meter long.

Further aspects of the invention and features of a wide range of non-limiting embodiments of the invention are described below and/or illustrated in the drawings.

BRIEF DESCRIPTION OF THE FIGURES

The accompanying drawings illustrate non-limiting embodiments of the invention.

FIG. 4A is a perspective view and FIG. 4B is a side view of a male member of the gap sub assembly of FIG. 2.

FIG. 5 is a perspective view of an insulating collar of the gap sub assembly of FIG. 2.

DETAILED DESCRIPTION

The embodiments described herein generally relate to gap sub assemblies for electromagnetic (EM) telemetry in downhole drilling. The gap sub assemblies include a collar in a gap section. The gap section is electrically insulating overall. The collar may be provided by one or more members that extend circumferentially around the gap sub and are supported by a plurality of discrete bodies. In some embodiments the circumferential members comprise rings. In a non-limiting example embodiment the rings are metal rings and the discrete bodies comprise ceramic spheres. The rings and discrete bodies may be embedded in an electrically-insulating material. The rings may be shaped to provide recesses to receive the discrete bodies.

The collar may be generally described as including a framework with a plurality of discrete bodies spaced within the framework. In some embodiments a portion of each of the discrete bodies protrudes radially outwardly past the framework. Either or both of the framework and the discrete bodies are made of an electrical insulator material thereby electrically isolating one end of the collar from the other end of the collar.

The collar is supported between two parts of the gap sub assembly. In some embodiments the gap sub assembly comprises a female member comprising a female mating section and a male member comprising a male mating section and a gap section. The male mating section is matingly received within the female mating section and electrically isolated therefrom. The insulating collar is positioned on the gap section.

The collar therefore electrically isolates the male member from the female member. The male member, female member and insulating collar function as the "gap sub" for EM telemetry. The male member and female member may each comprise a suitable coupling (e.g. an API standard threaded coupling) for coupling the gap sub to uphole and downhole parts of the drill string.

Figure 1:
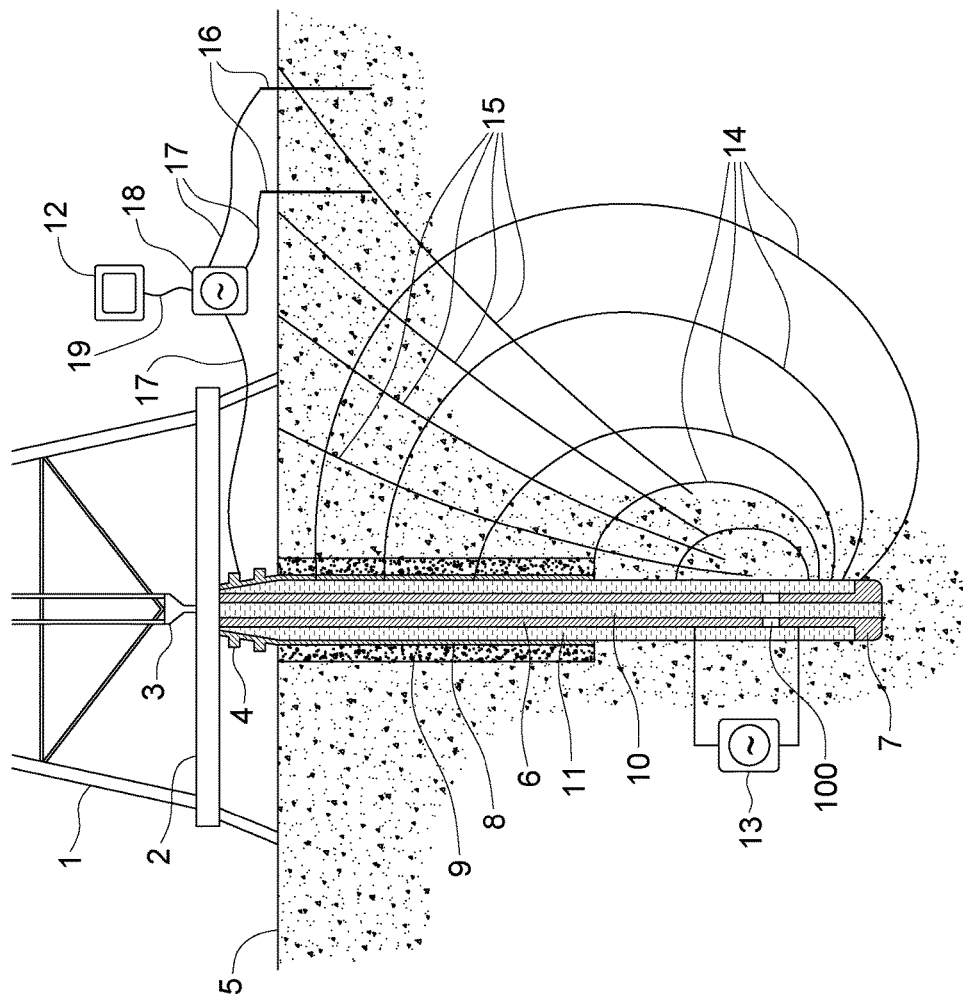
FIG. 1 is a schematic illustration showing a drilling site in which electromagnetic (EM) telemetry is being used for measurement while drilling in which embodiments of the invention can be employed.

FIG. 1 is a schematic representation of a drill site in which EM telemetry is being applied to transmit data to the surface. Gap sub assemblies according to embodiments of the present invention may be employed in transmitting EM telemetry signals. Downhole drilling equipment including a derrick 1 with a rig floor 2 and draw works 3 facilitate rotation of drill pipe 6 in the ground 5. The drill pipe 6 is enclosed in casing 8 which is fixed in position by casing cement 9. Drilling fluid 10 is pumped down drill pipe 6 and through an electrically isolating gap sub assembly 100 to drill bit 7. The drilling fluid returns to the surface by way of annular space 11 and passes through a blow out preventer (BOP) 4 positioned above the ground surface.

The gap sub assembly 100 may be positioned, for example, at the top of the BHA, with the BHA and the drill pipe 6 each forming part of a dipole antenna structure. Ends of gap sub assembly 100 are electrically isolated from one another. Gap sub assembly 100 effectively provides an insulating break, known as a gap, between the bottom of the drill string with the BHA and the larger top portion of the drill string that includes the rest of the drill pipe 6 up to the surface.

A very low frequency alternating electrical current 14 is generated by an EM carrier frequency generator 13 and driven across the gap sub assembly 100. The low frequency AC voltage is controlled in a timed/coded sequence to energize the earth and create an electrical field 15. Communication cables 17 transmit the measurable voltage differential between the top of the drill string and various surface grounding rods 16 located about the drill site to a signal receiver box 18. The grounding rods 16 may be randomly located on site with some attention to site operations and safety. A receiver box communication cable 19 transmits the data received to a rig display 12 to provide measurement while drilling information to the rig operator.

Some embodiments provide a gap sub construction in which a framework is compressed between uphole and downhole shoulders. The framework may comprise metal parts but is electrically insulating overall. The framework may be filled with a suitable dielectric material. In such embodiments the framework can stiffen the gap sub against bending forces and can protect the dielectric material against damage from contact with material in the wellbore.

In some embodiments the framework comprises a plurality of metal rings that are spaced apart from one another and from other electrically-conductive parts of the gap sub by electrically-insulating bodies. The electrically insulating bodies comprise ceramic spheres in some embodiments.

Figure 2:
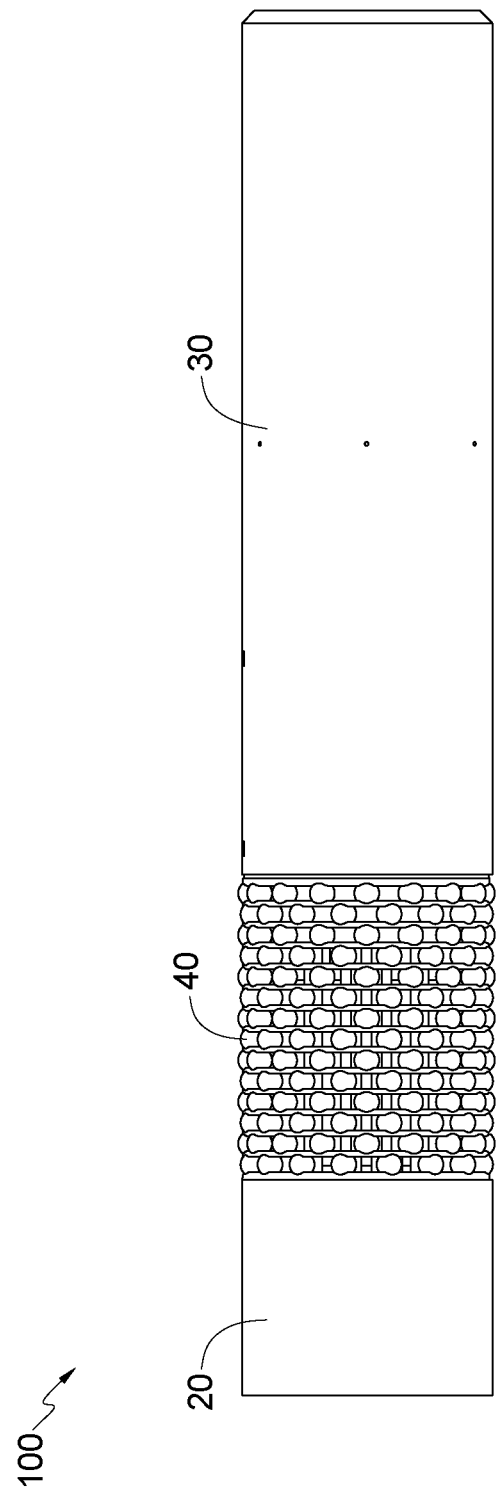
FIG. 2 is side view of a gap sub assembly according to a first embodiment.
Figure 3:
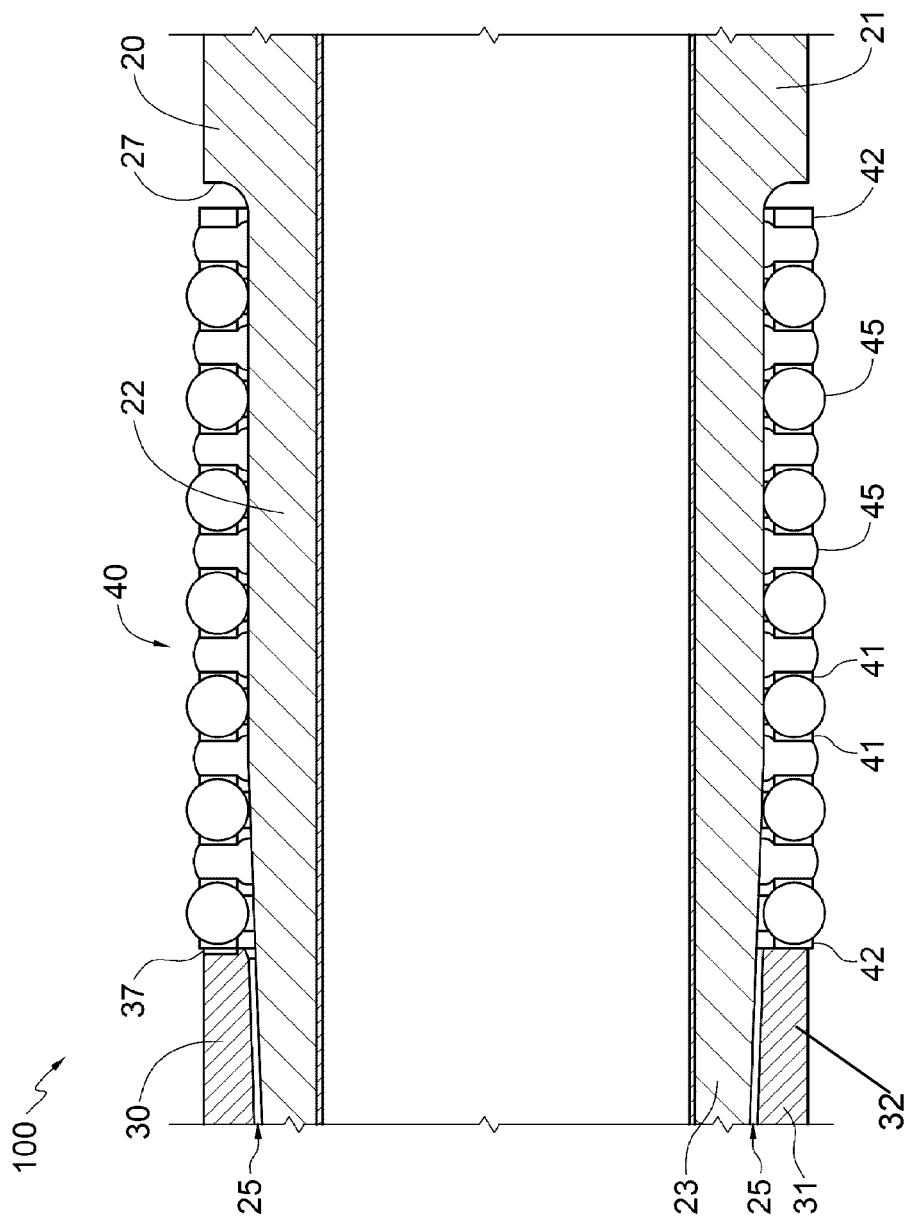
FIG. 3 is a cross sectional partial view of the gap sub assembly of FIG. 2.
Figure 6:
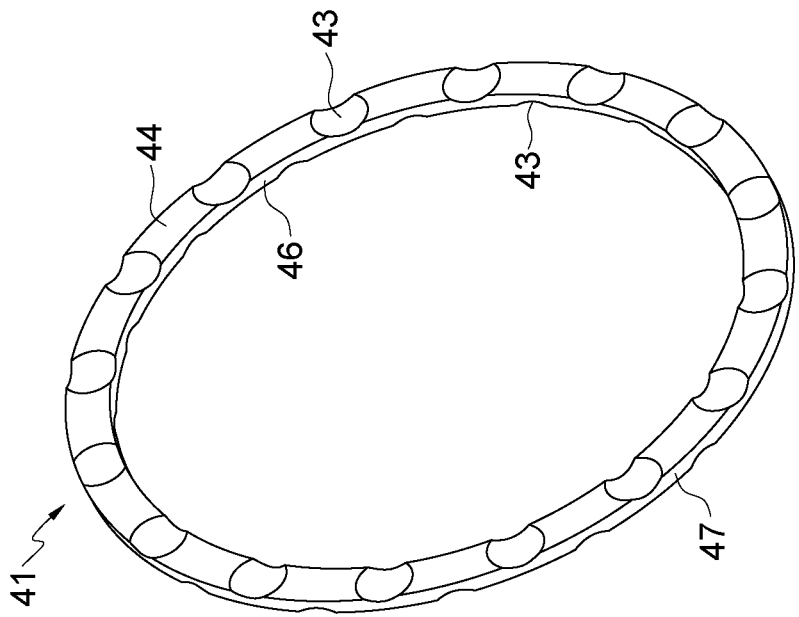
FIG. 6 is a perspective view of an internal ring of the insulating collar of FIG. 5.
Figure 7:
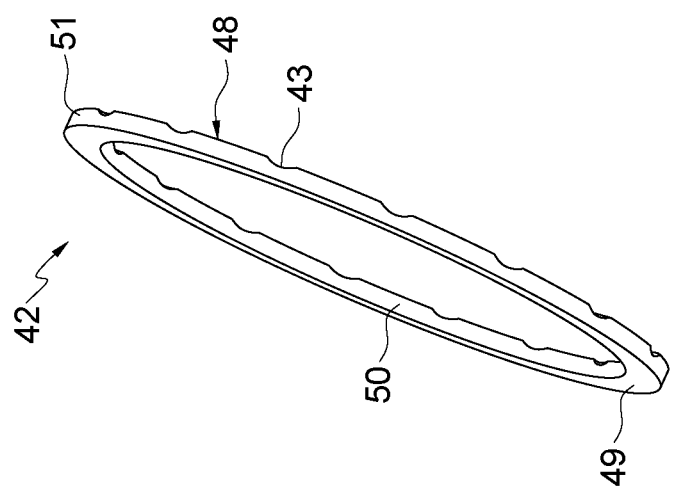
FIG. 7 is a perspective view of an end ring of the insulating collar of FIG. 5.

FIGS. 2 and 3 illustrate an example gap sub assembly 100 in accordance with an example embodiment of the invention. Gap sub assembly 100 includes a male member 20 mated with a female member 30 and an insulating collar 40 positioned on the male member 20 between a first shoulder 27 on the male member and a second shoulder 37 on the female member. When the gap sub assembly 100 is positioned in the drill pipe 6 as shown FIG. 1, the female member 30 may be uphole and the male member 20 may be downhole although this orientation is not mandatory.

As shown in FIGS. 4A and 4B, male member 20 comprises an electrically conductive body 28 with a bore therethrough. Body 28 may be circular in cross-section. Body 28 has a shoulder section 21, a middle gap section 22 and a mating section 23. Shoulder section 21 has a diameter greater than the diameters of gap section 22 and mating section 23, and forms part of the external surface of the gap sub assembly 100 shown in FIG. 2. Shoulder section 21 includes an annular shoulder 27 adjacent to gap section 22.

Mating section 23 is tapered and has an external diameter that gradually decreases such that the external diameter of mating section 23 in the area adjacent gap section 22 is greater than the external diameter of mating section 23 at its end furthest from gap section 22.

Female member 30 comprises an electrically conductive body 32 with a bore therethrough. Body 32 of female member 30 may be circular in cross section. Body 32 has a mating section 31 and a non-mating section. The internal surface of mating section 31 has a taper that corresponds to the taper of male mating section 23. The internal diameter of each part of female mating section 31 is greater than the external diameter of the corresponding part of male mating section 23 so that female mating section 31 fits over the male mating section 23 in the assembled gap sub assembly 100 as shown in FIG. 3.

Male and female mating sections 23, 31 are dimensioned such that there is a small radial gap 25 between the external surface of male mating section 23 and the internal surface of female mating section 31 when the male and female members 20, 30 are mated together. A high dielectric, non-conductive material can be injected, inserted, placed or filled, etc. into radial gap 25. This material may be introduced into gap 25, for example in any manner known in the art.

In alternative embodiments, the male and female mating sections may not be tapered. Additionally, or alternatively, other structures, for example, but not limited to grooves, threads or rings (not shown) may be included on the internal surface of the female mating section 31 and/or the external surface of the male mating section 23 to facilitate mating of the male and female members 20, 30.

FIG. 3 shows a male member 20 and female member 30 in mating relationship. Collar 40 is positioned on the gap section 22 between an annular female shoulder 37 on one end of the female mating section 31 and male annular shoulder 27. In some embodiments, collar 40 is compressed between shoulders 27 and 37. In some embodiments, collar 40 is compressed with a pressure of between 500 psi and 8000 psi. Collar 40 may be rigid under compression such that the interaction between collar 40 and shoulders 27 and 37 stiffens gap sub assembly 100 against bending. This construction tends to prevent or reduce flexure of the gap section 22 by transmitting mechanical loads resulting from flexing of gap section 22 into shoulders 27, 37.

FIGS. 5 to 9 show an example insulating collar 40 comprising a plurality of internal rings 41 positioned between two end rings 42. A plurality of discrete bodies, which in the embodiment shown in FIGS. 5 to 9 are spheres 45, are seated between adjacent rings 41, 42. In one embodiment, rings 41, 42 are made of a metal or metal alloy, for example, but not limited to, copper, copper alloys (e.g. beryllium copper), aluminium or stainless steel. In such embodiments spheres 45 are made of an electrical insulator material, for example, but not limited to, ceramic, plastic, plastic coated metals, composite or carbides. In an alternative embodiment, the rings 41, 42 are made of an electrical insulator material, for example, but not limited to plastic and the spheres 45 are made of a metal or metal alloy. In other alternative embodiments, both rings 41 and 42 and spheres 45 are made of electrically insulating material(s).

Spheres 45 or other discrete bodies may support rings 41 and 42 with their internal faces spaced apart from male member 20. Thus, even if rings 41, 42 are made of materials that are electrically conducting, rings 41, 42 do not provide a direct electrically-conducting path to the material of male member 20.

Internal rings 41 have two opposed side faces 44 extending between an internal face 46 and an opposed external face 47. End rings 42 have an inner side face 48 and an opposed outer side face 49 spaced between an internal face 50 and an external face 51. In the embodiment shown, the end ring internal and external faces 50, 51 are thicker than the internal and external faces 46, 47 of internal rings 41.

Figure 16:
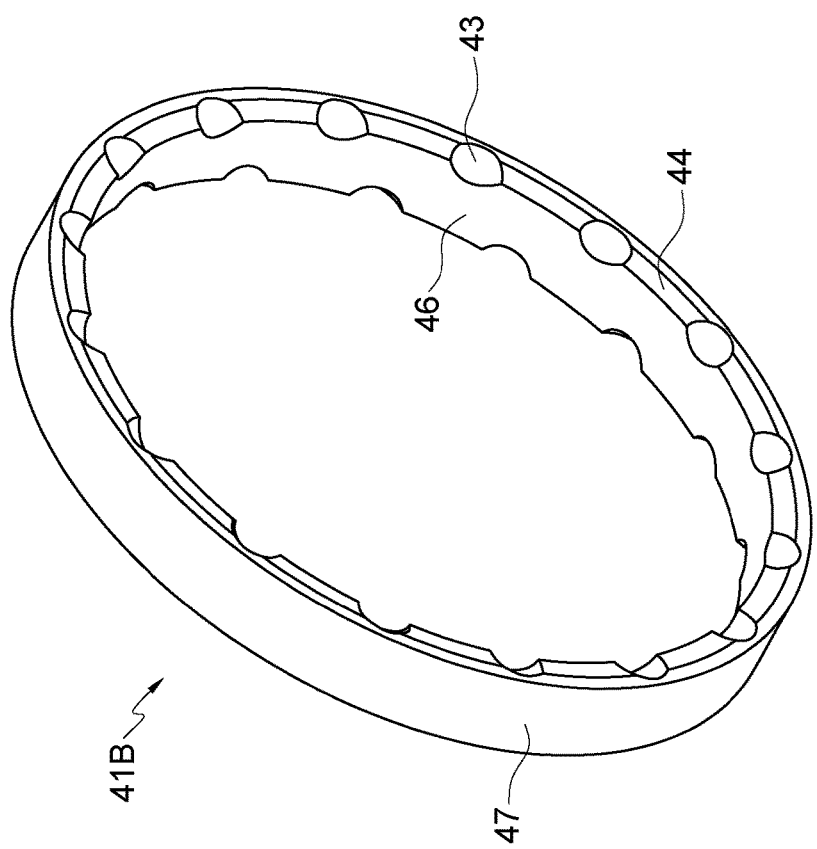
FIG. 16 is a perspective view of an internal ring of an insulating collar according to an example embodiment.

FIG. 16 illustrates a ring 41B according to an improved alternative design. Ring 41B is similar to rings 41 except that it is tapered in thickness such that outer parts of ring 41B close to external face 47 are thicker than inner parts of ring 41b closer to internal face 46. In some embodiments ring 41B tapers to an edge at which side faces 44 meet. In such embodiments internal face 46 may be very narrow.

When the internal rings 41 are made of metal or metal alloy, it may be beneficial for the internal ring internal and external faces 46, 47 to be thin so as to provide minimal electrically conductive material within the non-conductive gap of the gap sub assembly 100. A greater thickness to the end ring internal and external faces 50, 51 may provide structural stability to the collar 40.

In alternative embodiments (not shown) the internal ring internal and external faces 46, 47 may be the same thickness as the end ring internal and external faces 50, 51, or the internal ring internal and external faces 46, 47 may be thicker than the end ring internal and external faces 50, 51 or the rings 41, 42 may be of varying size, shape, and placement for various structural requirements.

In some embodiments, rings 41 and 42 trap spheres 45 or other discrete bodies against male member 20. This is accomplished in some embodiments by making side faces 44 of rings 41 beveled. In some embodiment side faces 44 have pockets for receiving spheres 45 or other bodies.

Figure 16A:
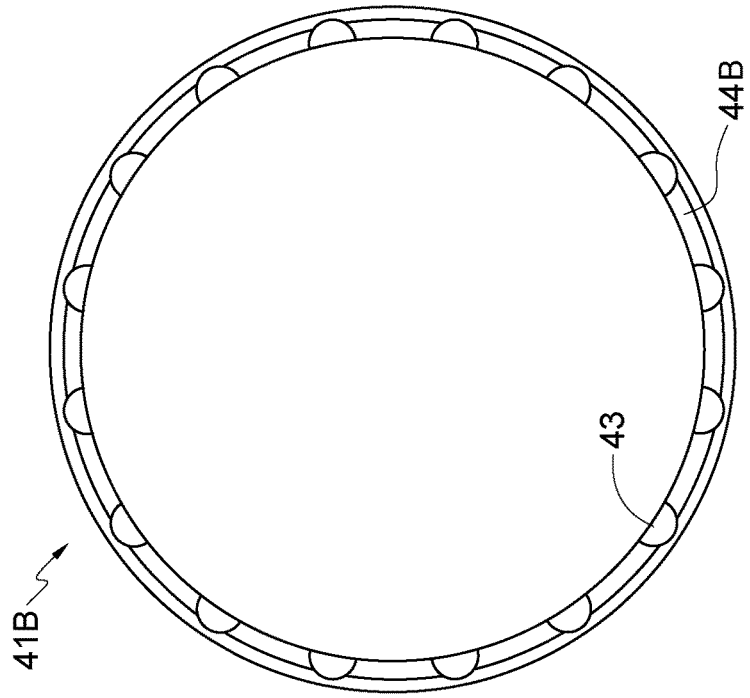
FIGS. 16A and 16B are front and back views of the internal ring of FIG. 16.
Figure 16B:
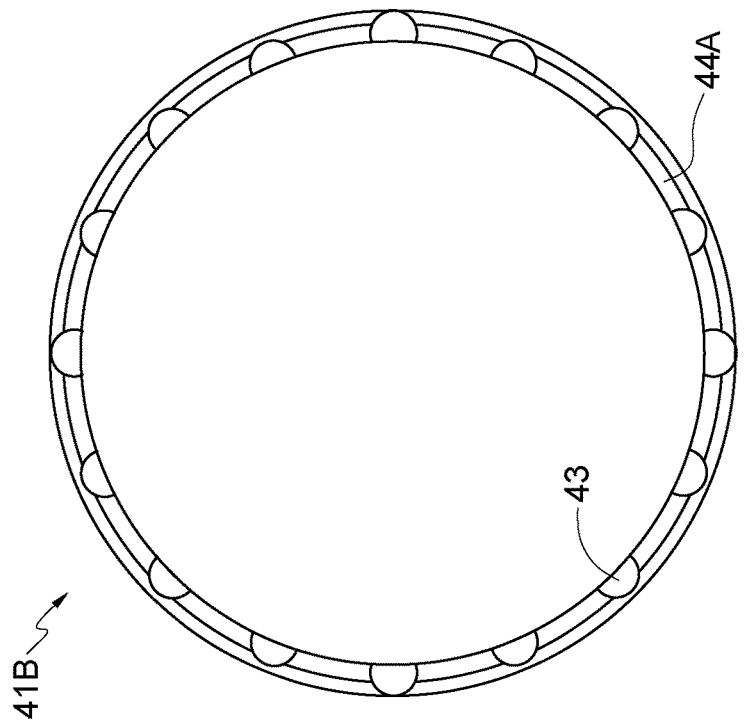

In the embodiments illustrated in FIGS. 16A and 16B, side faces 44 of the internal rings 41 have a plurality of surface depressions or dimples 43 spaced around their surfaces. Dimples 43 on one side face 44A of each internal ring 41 are offset with the dimples 43 on the opposed side face 44B. Offsetting of dimples 43 on opposed side faces 44A and 44B of internal rings 41 allows for thinner internal rings 41 as the dimples 43 are offset rather than back to back. As discussed above, the use of thinner internal rings 41 reduces the amount of electrically conductive material within the non-conductive gap of the gap sub assembly 100 when the internal rings 41 are made of metal or metal alloy. Furthermore more spheres 45 can be included in the collar 40 when the internal rings 41 are thinner. This may increase the wear resistance of collar 40 as will be discussed in more detail below.

The inner side face 48 of each of the end rings 42 also has a plurality of dimples 43 spaced around the surface thereof. The outer side face 49 may be smooth so that it can butt against the male or female shoulder 27, 37. It is not necessary for there to be dimples 43 in outer side face 49.

Collar 40 may be assembled on the gap section 22 before mating the male and female members 20, 30 together. One of end rings 42 is placed over gap section 22 and positioned with its outer side face 49 adjacent to male shoulder 27. Internal rings 41 are then stacked onto the gap section 22 followed by the other end ring 42 with its inner side face 48 facing the side face 44 of the adjacent internal ring 41.

Rings 41, 42 are positioned such that the dimples 43 of adjacently facing internal ring side faces 44 are aligned and the dimples 43 of the end ring inner side faces 48 and the adjacently facing internal ring side face 44 are aligned. Spheres 45 are positioned between the rings 41, 42 and sit in the aligned dimples 43. The profile of the dimples 43 correspond to the curved profiles of spheres 45, thereby securing each sphere 45 between the side faces 44, 48 in the assembled collar 40.

Alternatively, the stacked rings 41, 42 and spheres 45 may be assembled to form collar 40 before positioning the collar 40 onto gap section 22.

The outer surface of male member 20 may include recesses such as dimples, holes or grooves that receive spheres 45. For example, gap section 22 may have a plurality of longitudinally extending grooves 24 spaced around the circumference of the external surface of gap section 22. The number of grooves 24 is dictated by the design of the collar 40 as will be discussed in detail below. The geometry of the grooves 24 (depth, placement, profile, length, etc.) is a function of the geometry of the collar 40 and gap section 22. The sides of spheres 45 facing toward gap section 22 may be received in grooves 24.

Collar 40 (or alternative collars 140, 240 discussed below) may be positioned on gap section 22 such that each of spheres 45 sits in one of longitudinal grooves 24 of gap section 22. In the embodiments shown in FIGS. 4A and 4B, there are thirty two grooves 24 spaced around the circumference of the gap section 22. This allows for spheres 45 in each of the offset layers of the collar 40 shown in FIG. 5 to be received in one of grooves 24. In alternative embodiments (not shown), the number of grooves 24 may vary. This number of grooves 24 provided in a specific embodiment may depend on the number of spheres 45 in each layer and the offset arrangement of the collar layers. For example, a collar made up of the rings 41, 42 of FIG. 10 may have sixteen spheres 45 in each layer, however the layers are not offset, therefore only sixteen grooves 24 need to be present on the gap section to receive each sphere 45. Positioning of the spheres 45 in the longitudinal grooves 24 locks collar 40 (or 140, 240) in place. This beneficially prevents rotation or torsional movement of the collar 40, 140, 240 and thereby may increase the torsional strength of gap section 22.

Dimples 43 may be uniformly spaced around rings 41. Grooves 24 may be uniformly spaced around the circumference of gap section 22.

The spacing of the dimples 43 around the side faces 44 of the internal rings 41 and the inner side face 48 of the end rings 42 is such that there are gaps between the spheres 45 seated in the dimples 43.

In the embodiments shown in FIGS. 5 to 9 rings 41 and 42 have sixteen dimples 43 uniformly spaced around each of the internal ring side faces 44 and each of the end ring inner side faces 48. Sixteen spheres 45 are therefore seated between a pair of adjacent rings 41, 42, which make up one layer of the collar 40. The spheres 45 of each layer have an angular spacing of Y degrees.

Figure 9:
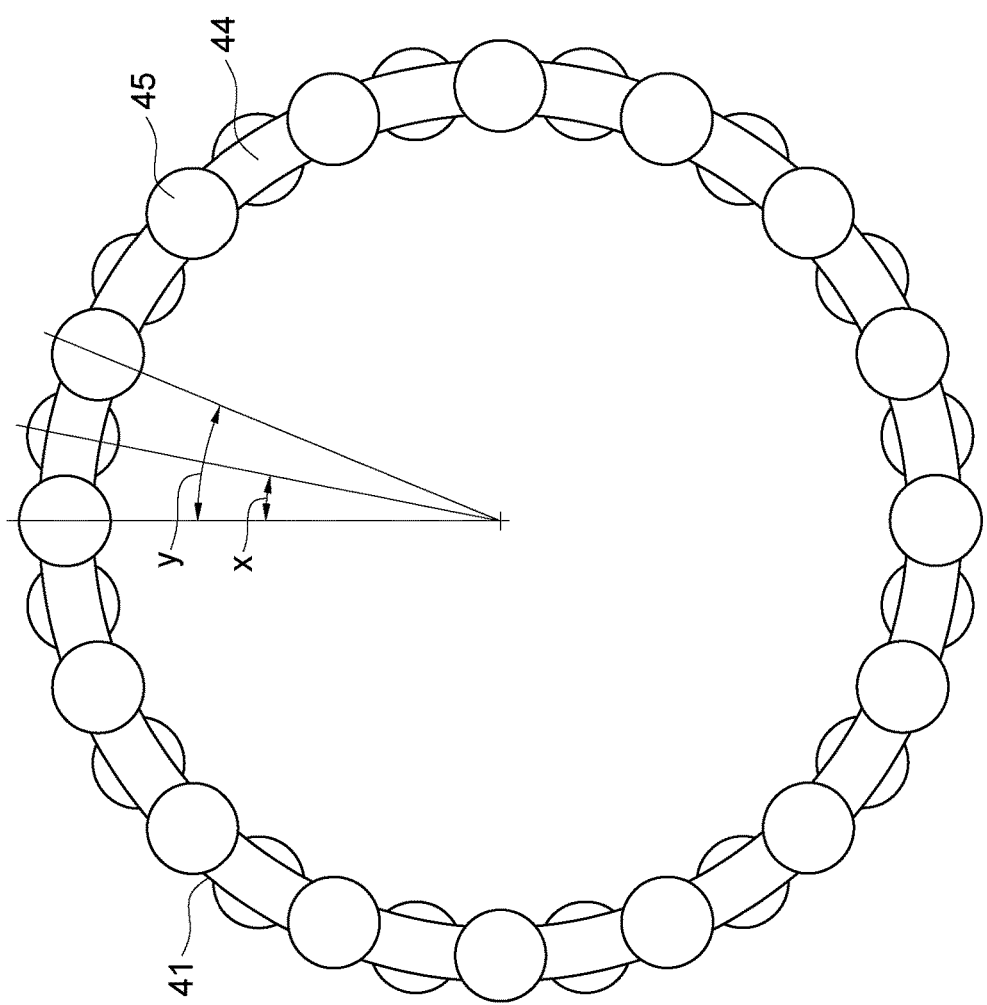
FIG. 9 is a face view of an internal ring of the insulating collar of FIG. 5 showing ceramic spheres seated in surface depressions on opposed side faces of the internal ring.

In the exemplary embodiment shown in FIG. 9, there are sixteen spheres 45 and Y is 22.5 degrees. As a result of offsetting of the dimples 45 of opposed side faces 44 of each of the internal rings 41, the spheres of two adjacent layers are also angularly offset. The angular offset of spheres 45 in adjacent layers is X degrees. In the exemplary embodiment shown in FIG. 9, X is one half the angle of the radial spacing of the spheres 45 in the adjacent layer, therefore X is 11.25 degrees. The spheres 45 of each layer are therefore located in alternating fashion when viewed longitudinally along the collar 40, with alignment of the spheres 45 of layers 1, 3, 5 etc and alignment of the spheres 45 of layers 2, 4, 6 etc.

In an alternative embodiment as shown in FIGS. 14 and 15A-C, the outer side face 49a of end rings 42a of insulating collar 40a include spaced dimples 43 and corresponding aligning dimples 43 are included on the surfaces of male and female shoulders 27a, 37a of male and female members 20a, 30a respectively. The dimples 43 on the male shoulder 27a align with the longitudinal grooves 24a of the gap section 22a. Spheres 45 are positioned between the end rings 42a and the male and female shoulders 27a, 37a. In an alternative embodiment (not shown) only one of the end rings 42a and one of the corresponding male or female shoulders 27a, 37a may have dimples 43 thereon for positioning of spheres 45 therein.

The dimples 43 of the outer side face 49a of each end ring 42a are offset from the dimples 43 on the inner side face 48a of that end ring 42a, so that the spheres 45 positioned between the outer side faces 49a and the male and female shoulders 27a, 37a are offset from the spheres 45 in adjacent layers of collar 40a. In an alternative embodiment (not shown) the dimples 43 on the outer side face 49a of each end ring 42a align back to back with the dimples 43 on the inner side face 48a of that end ring 42a.

In alternative embodiments (not shown) the number of spheres 45 in each layer may be more or less than sixteen depending on the size of the rings 41, 42, the size of the spheres 45 and the spacing between each sphere 45. Furthermore, the spacing of the dimples 43, and thus the spheres 45, may be random rather than uniform. Furthermore, in an alternative embodiment (not shown), the radial offset X of spheres 45 of adjacent layers of the collar 40 may be more than or less than half the radial spacing Y between the spheres 45. For example X may be one third of Y so that spheres of the $1^{st}$, $4^{th}$, $7^{th}$ layer etc. align, spheres of the $2^{nd}$, $5^{th}$, $8^{th}$ layer etc. align, and spheres of the $3^{rd}$, $6^{th}$, $9^{th}$ layers etc. align. Alternative embodiments (not shown) may use a different pattern of radial spacing of spheres 45. Other innovative aspects of the invention apply equally in embodiments such as these.

Figure 10:
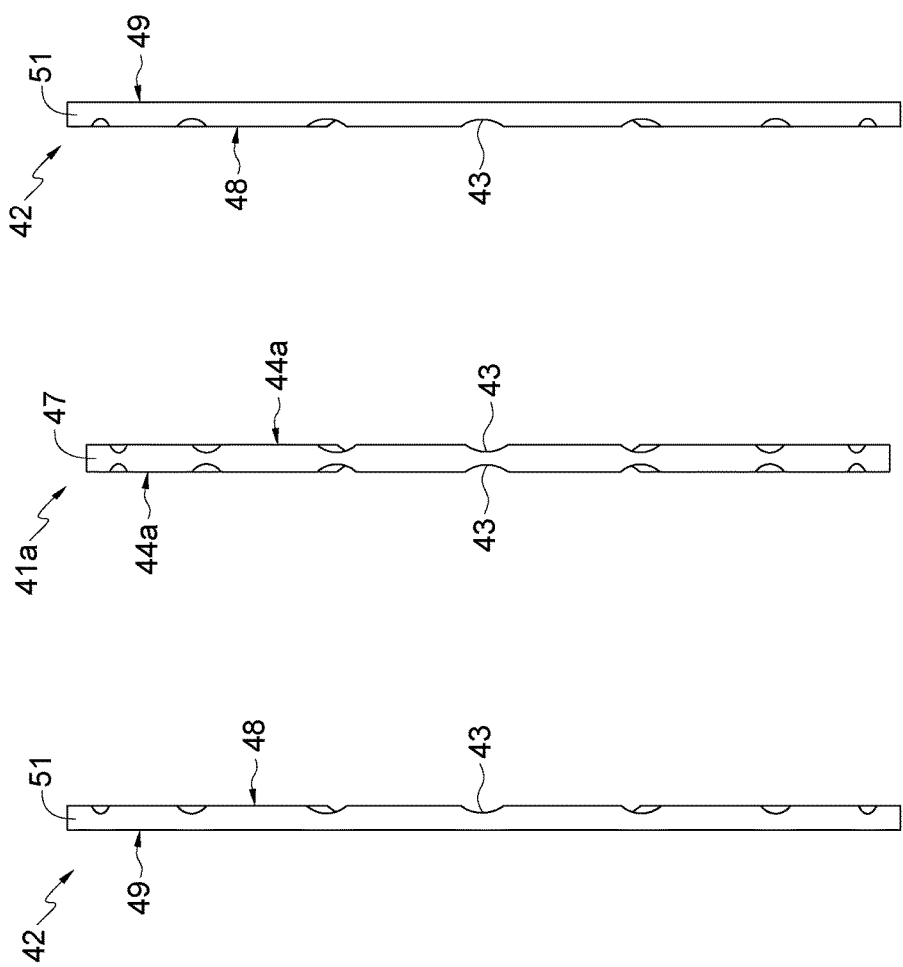
FIGS. 10A, 10B and 10C are side views of an end ring, internal ring and the other end ring respectively according an alternative embodiment of the insulating collar.

In an alternative embodiment shown in FIG. 10, the internal ring 41a has dimples 43 in back to back alignment on each opposed side faces 44a of the internal ring 41a, such that spheres 45 positioned between the internal and end rings 41a, 42 will be aligned rather than offset. Alignment of spheres 45 back to back may beneficially transmit stresses more readily for specific drilling applications and may provide structural strength and stiffness to the collar, which may be important when there are high stresses on the gap sub assembly, for example when the downhole drilling trajectory encompasses a number of curves.

As discussed above with regards to the embodiment shown in FIGS. 5 to 9, the end rings 42 of this alternative embodiment may optionally include dimples 43 on the outer side face 49, such that spheres 45 can be positioned between the end rings 42 and the male and female shoulders 27, 37. The dimples 43 of the outer side face 49 of the end rings 42 may align back to back or may be offset from the dimples 43 on the inner side face 48 of the end rings 42 in this alternative embodiment.

Figure 8:
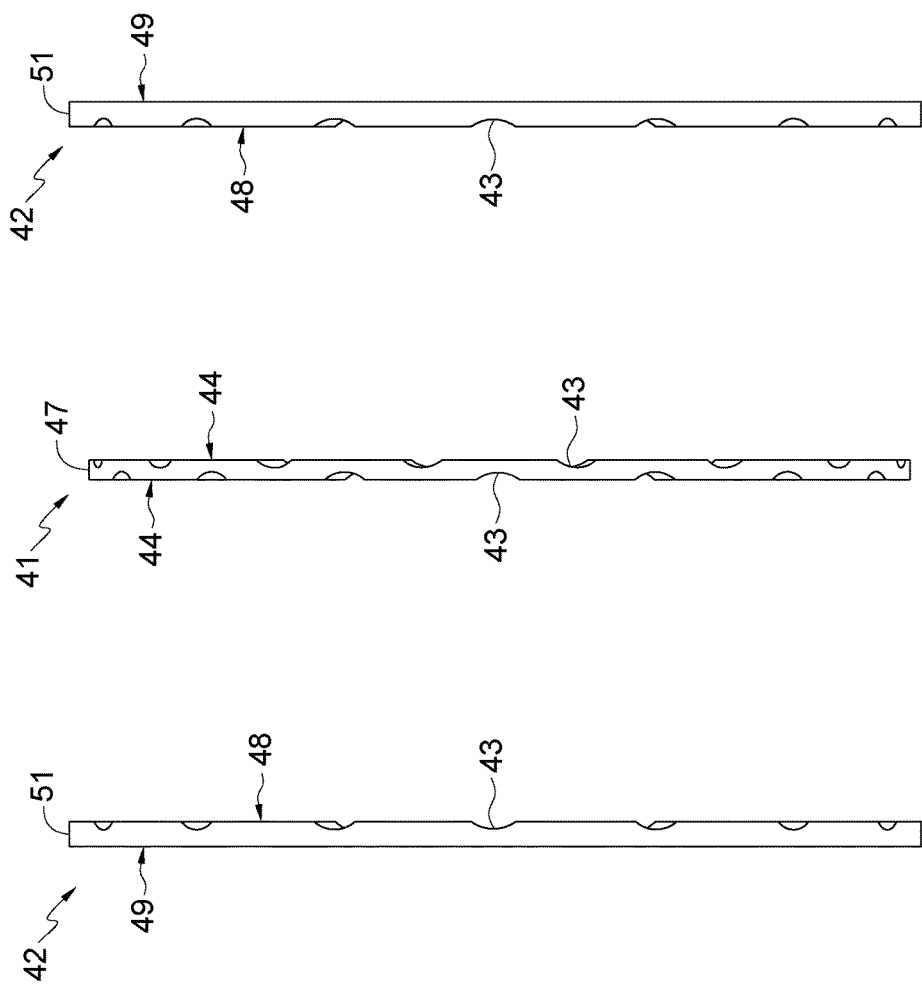
FIGS. 8A, 8B and 8C are side views of the end ring, internal ring and the other end ring respectively of the insulating collar of FIG. 5.
Figure 11:
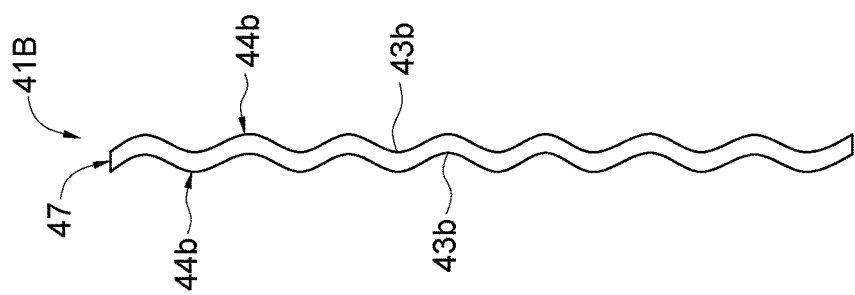
FIG. 11 is a side view of an internal ring according to an alternative embodiment of the insulating collar.

In a further alternative embodiment shown in FIG. 11, an internal ring 41b has undulating side faces 44b and surface depressions 43b are provided as a result of the undulating side faces 44b. The surface depressions 43b are offset on opposed side faces 44b of the internal ring 41b. The end rings may also be undulating (not shown) and spheres 45 may be positioned between the surface depressions of the outer side face of the end rings and the male and female shoulders 27, 37. Alternatively, the end rings may be as shown in FIGS. 8 and 10.

It is evident from the foregoing that while the embodiments shown in FIGS. 5 to 11, utilize spheres 45 and dimples 43 or surface depressions 43b with a curved profile, in alternative embodiments differently-shaped discrete bodies, such as cuboids, cube, cylinder or egg shaped bodies may be used. In these alternative embodiments the profile of the dimples 43 or surface depressions 43b on the internal ring side faces 44, 44a, 44b and the end ring inner side faces 48 (and optionally the end ring outer side faces 49) may correspond with the profile of the discrete bodies so that the discrete bodies are securely seated between the side faces 44, 44a, 44b, 48, 49.

Furthermore, in alternative embodiments there may be no dimples 43 on the ring faces 44, 41a, 48, 49 and the discrete bodies may be secured between the rings 41, 41a, 42 in some other way, for example using an adhesive or another structural feature such as a protrusion from the surface of the rings (not shown). Other innovative aspects of the invention apply equally in embodiments such as these.

It can be desirable to apply compressive pre-load to collar 40. Such preloading may be achieved in various ways.

One way to apply compressive preloading to collar 40 is to insert wedges or the like (not shown) made of any dielectric and/or conductive material between one or both of the male and female shoulders 27, 37 and the outer side face 49 of the adjacent end rings 42.

Another way to apply compressive pre-loading to collar 40 is to press or pull on male and female members 20, 30 so as to force male shoulder 27 toward female shoulder 37 before mating male and female members 20, 30 to one another.

Another way to apply compressive pre-loading to collar 40 is to provide an electrically-insulating threaded coupling between male and female members 20, 30. The threaded coupling may permit drawing male shoulder 27 toward female shoulder 37 by turning male member 20 relative to female member 30. By way of non-limiting example, the threaded coupling may comprise helical grooves formed on an outside diameter of mating section 23 of male member 20 and corresponding helical grooves formed on an inside diameter of mating section 31 of female member 30. The threaded connection may be completed by providing electrically insulating members (such as electrically insulating spheres for example) that engage the grooves in the male and female members. An example of this construction is described elsewhere herein.

Another way to apply compressive loading to collar 40 is to provide high strength electrically insulating rods or cords that extend across gap section 22 (for example between rings 41, 42 and male member 20) and can be tightened to draw shoulders 27, 37 toward one another.

Another way to apply compressive loading to collar 40 is to provide a member adjacent to shoulder 27 that has internal threads that engage corresponding threads on the outer diameter of male member 20 at the end of gap section 22 adjacent to shoulder section 21. The member may be turned relative to male member 20 so that it advances toward shoulder 37 to compress collar 40. The member may have holes passing through it to facilitate filling both sides of the member with a suitable dielectric material as discussed below. In an alternative embodiment a threaded member is adjacent shoulder 37 and can be turned to compress collar 40 against shoulder 27.

Another way to apply compressive loading to collar 40 is to provide a member adjacent to shoulder 27 or 37 that can be forced toward the opposing shoulder 37 or 27 by way of suitable cams, wedges, bolts or the like.

Once collar 40 is positioned on the gap section 22 female member 30 can be mated with male member 20 to form the gap sub assembly 100. Where collar 40 will be compressively pre-loaded then, depending on the mechanism for applying the pre-loading, the preloading may be performed before, after or as part of mating male section 20 to female section 20. A suitable dielectric material may then be applied to fill the spaces around collar 40.

Providing a collar 40 that is compressed can increase resistance of the gap section to bending. Essentially, collar 40 may carry forces between shoulders 27 and 37 thereby resisting bending. Collar 40 functions in place of solid material that would be present in a section of drill string lacking a gap section. A gap section which includes a collar 40 may approximate the resistance to bending of an equivalent section of drill string. In some embodiments, the section of drill string having collar 40 has a Young's modulus which is at least 100%, 99%, 95%, 90%, 80%, 70%, or 50% of the Young's modulus of an equivalent section of drill string that does not have a gap section. An equivalent section of drill string may comprise a section of drill string with the same material, outer diameter and bore diameter as gap sub assembly 100 but made of solid metal.

In some embodiments compressive forces applied to collar 40 are transmitted by way of a ring and the points at which forces are applied to one side face of the ring are angularly offset relative to the points at which forces are applied to the opposing side face of the ring. These forces can therefore cause some bending of the ring which may act as a stiff spring, In such embodiments, forces which attempt to bend the gap sub will attempt to further compress collar 40 along one side of the gap sub. Collar 40 can resist such further compression thereby stiffening the gap sub against bending. The stiffness of collar 40 may be adjusted by selecting the construction of the rings, the material of the rings, the width of the rings, the thickness of the rings, the ring geometry, and/or the number of spheres 45 or other discrete bodies spaced around the rings. Stiffness may be increased by increasing the number of spheres 45 in each layer of collar 40 (all other factors being equal).

Female member 20 may be mated to male member 30 in various ways. For example, the dielectric material may hold male part 20 to female part 30. Projections, indentations or the like may be provided in one or both of male member 20 and female member 30 to better engage the dielectric material.

As another example, male member 20 may be pinned to female member 30 using electrically insulating pins, bolts or the like. Male and female members may also or in the alternative be pinned together with metal pins. The metal pins may be attached at one end to one of male member 20 and female member 30 (for example by being press-fit, welded in place, or the like. The other end of the metal pins may pass through an aperture in the other member (either male member 20 or female member 30). The aperture is large enough that the metal pin does not contact the material of the other member directly. An electrically insulating material fills the space in the aperture surrounding the second end of the metal pin. The electrically insulating material may, for example, comprise a moldable dielectric material. In some embodiments, some pins are attached to male member 20 and pass through apertures in female member 20 and some pins are attached to female member 30 and pass through apertures in male member 20. In each case the pins are electrically insulated from the member that they are not attached to.

In some embodiments, some or all of the pins are made of an insulating material. In some embodiments, some or all of the pins are not directly attached to either male member 20 or female member 30, but are inserted through apertures in female member into a corresponding bore in male member 20. These inserted pins may be held in place by an injected dielectric material, an adhesive, or the force of friction.

A high dielectric, non conductive material, for example, but not limited to, an injectable thermoplastic or epoxy or engineered resin is injected into the radial gap 25 between the external surface of the male mating section 23 and the internal surface of the female mating section 31. The injected dielectric material sets and electrically isolates the male mating section 23 from the female mating section 31, as well as preventing drilling fluid from filling the radial gap 25. The dielectric material may additionally help to attach male member 20 to female member 30.

Figure 17:
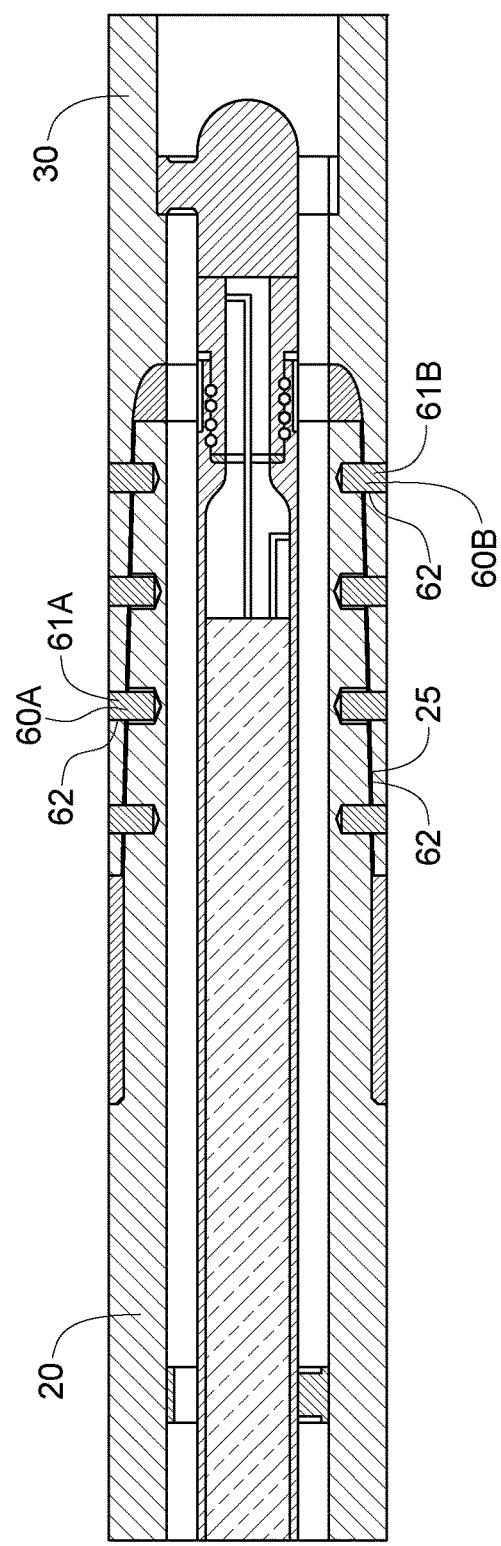
FIG. 17 is a cross sectional view of a pinned connection between a male and a female member according to an example embodiment.

FIG. 17 shows an example of a pinned connection between male member 20 and female member 30. In this example, a pin 60A is attached to and projects outwardly from male member 20 into an aperture 61A in female member 30. A dielectric material 62 fills aperture 61A around pin 60A. Also shown is a pin 60B that is attached to and projects inwardly from female member 30 into an aperture 61B in male member 20. The portion of aperture 61B around pin 60B is filled with dielectric material 62. The dielectric material 62 may also fill the gap 25 between male member 20 and female member 30.

The number of pins and their locations may be varied. Pins 60A and/or 60B may be spaced apart around the circumferences of male member 20 and female member 30. Different pins 60A and/or 60B may be at the same and/or different axial positions along male member 20 and female member 30.

As another example, male member 20 may be held to female member 30 by providing electrically-insulating bodies (e.g. spheres) that engage grooves or other indentations in male member 20 and female member 30. The electrically-insulating bodies may be inserted into gap 25 through apertures in female member 30. An example embodiment having this construction is discussed below and illustrated in FIGS. 18-20. In some embodiments male member 20 has a plurality of sets of grooves in mating section 23 and female member 30 has a corresponding plurality of sets of grooves in mating section 31. The grooves of different ones of the sets of grooves may be non-parallel. For example, one set of grooves may extend circumferentially around mating section 23 and another set of grooves may extend longitudinally in mating section 23. Bodies received in the first set of grooves may assist in resisting tension forces while bodies received in the second set of grooves may assist in resisting torques.

The same or a different dielectric material is injected into the spaces between the spheres 45 in each layer of collar 40 and into the space between the collar 40 and the male and female shoulders 27, 37, such that the spheres 45 and rings 41, 42 (and wedges when present) are immersed in the dielectric material. The injection step may be a one phase step whereby the dielectric material is injected into the radial gap 25 and into all spaces of the collar 40 and gap section 22. Alternatively, the dielectric material may be injected in the spaces of the collar 40 before the male and female members 20, 30 are mated. In some embodiments, dielectric material is injected to fill collar 40 before collar 40 is positioned on gap section 22. In another embodiment the dielectric material is injected into radial gap 25 and into the spaces between rings 41, 42 in a number of steps.

It is advantageous to provide vents (for example, radially extending grooves) on outer side faces 49 of end rings 42. Such vents can aid in ensuring that the injected dielectric material suitably embeds end rings 42. The extrusion of small amounts of dielectric material through such vents can be used as an indication that the dielectric material is filling collar 40.

One advantage of making collar 40 using rings 41, 42 that have a tapered cross-section or otherwise provide undercuts on side faces 44, 48, 49 is that such rings help to retain the dielectric material in the spaces between adjacent rings 41, 42. When rings 41, 42 are tapered the spaces between the rings can be very generally trapezoidal in cross section. A wedging action between the dielectric material in such spaces and the side faces 48, 19 of the rings helps to resist tear out of the dielectric material.

The amount of dielectric material needed is reduced compared to conventional gap sub assemblies as the material need only be injected in the spaces between the spheres 45 rather than covering the whole of the gap section 22.

In the assembled gap sub assembly 100, the spheres 45 in layers of the collar 40 and the dielectric material creates a dielectric space confined by the male and female shoulders 27, 37 and defined by the diameter of the spheres 45 and the geometry of any rings 41, 42 provided.

While the embodiment shown in FIGS. 2, 3 and 5 show the insulating collar 40 with a plurality of internal rings 41, in an alternative embodiment (not shown) there may be only one internal ring 41, 41a, 41b positioned between the two end rings 42 or positioned directly between shoulders 27, 37.

The number of internal rings 41, 41a, 41b can be varied depending on the size of the male gap section 22, which beneficially allows collar 40 to be designed to fit any sized gap. An advantage of this construction is that it permits the use of gaps that are much larger than the gaps in current common use. A very large gap can facilitate the use of higher-voltage signals for EM telemetry. This, in turn can result in improved data communication from greater depths and/or from formations that are not ideal for EM telemetry. A further advantage of the use of a very large gap is that the electrical power needed for EM telemetry may be reduced.

While the gaps of typical conventional gap subs range from less than 1 inch (less than 2½ cm) to a few inches (e.g. 20 cm or so), the construction described herein may be applied to provide gaps that are more than 3 feet (more than about 1 meter) or 4 feet (more than about 1⅓ meters) across. In some cases the gaps may exceed 10 feet (about 3 meters) across. In some embodiments gaps may be 30 feet or more (about 10 meters or more across).

While constructions as described herein are well suited for making gap subs having extended gaps, a gap sub having an extended gap may be made using other constructions. The inventive concept of providing a gap sub having a gap much longer than is typical in previously-available gap subs is independent of the specific details of construction described above.

In a further alternative embodiment (not shown), the insulating collar 40 may have no internal rings 41, 41a, 41b and only the two end rings 42 with discrete bodies seated between the two inner side faces 48 of the end rings 42 and optionally between the outer side faces 49 of the end rings and the male and female shoulders 27, 37. In a further alternative embodiment (not shown), there may be only one internal ring 41, 41a, 41b with discrete bodies positioned between each of the opposed side faces 44 and the male and female shoulders 27, 37. In yet a further alternative embodiment (not shown) there may be one internal ring 41, 41a, 41b and one end ring 42, with the outer side face 49 of the end ring 42 adjacent either one of the male or female shoulders 27, 37 and discrete bodies positioned between the inner side face 48 of the end ring 42 and one of the opposed side faces 44, 44a, 44b of the internal ring 41, 41a, 41b and between the other of the opposed side faces 44, 44a, 44b of the internal ring 41, 41a, 41b and the other of the male or female shoulders 27, 37. The rings may not be circular and could for example be oval, square, or slit rings. The rings may also be double rings. Other innovative aspects of the invention apply equally in embodiments such as these.

Advantageously, rings 41, 42 may be made of or have their external faces 47, 51 coated with or formed of a hard abrasion-resistant metal. In such embodiments, rings 41, 42 protect the dielectric material that fills the spaces between the rings from abrasion. The material of rings 41, 42 is preferably not so brittle that rings 41 or 42 will break under expected operating conditions.

As shown for example in FIG. 11, in some embodiments, rings 41, 42 may have undulating side faces. Even rings which do not have undulating side faces, may deform as a result of axial compression of collar 40 so that their side faces undulate to some degree. Rings may optionally be machined to provide undulating side faces. Undulating side faces of rings 41 and 42 can be advantageous for helping to prevent scouring of the dielectric material between the rings by formations encountered downhole.

Figure 18:
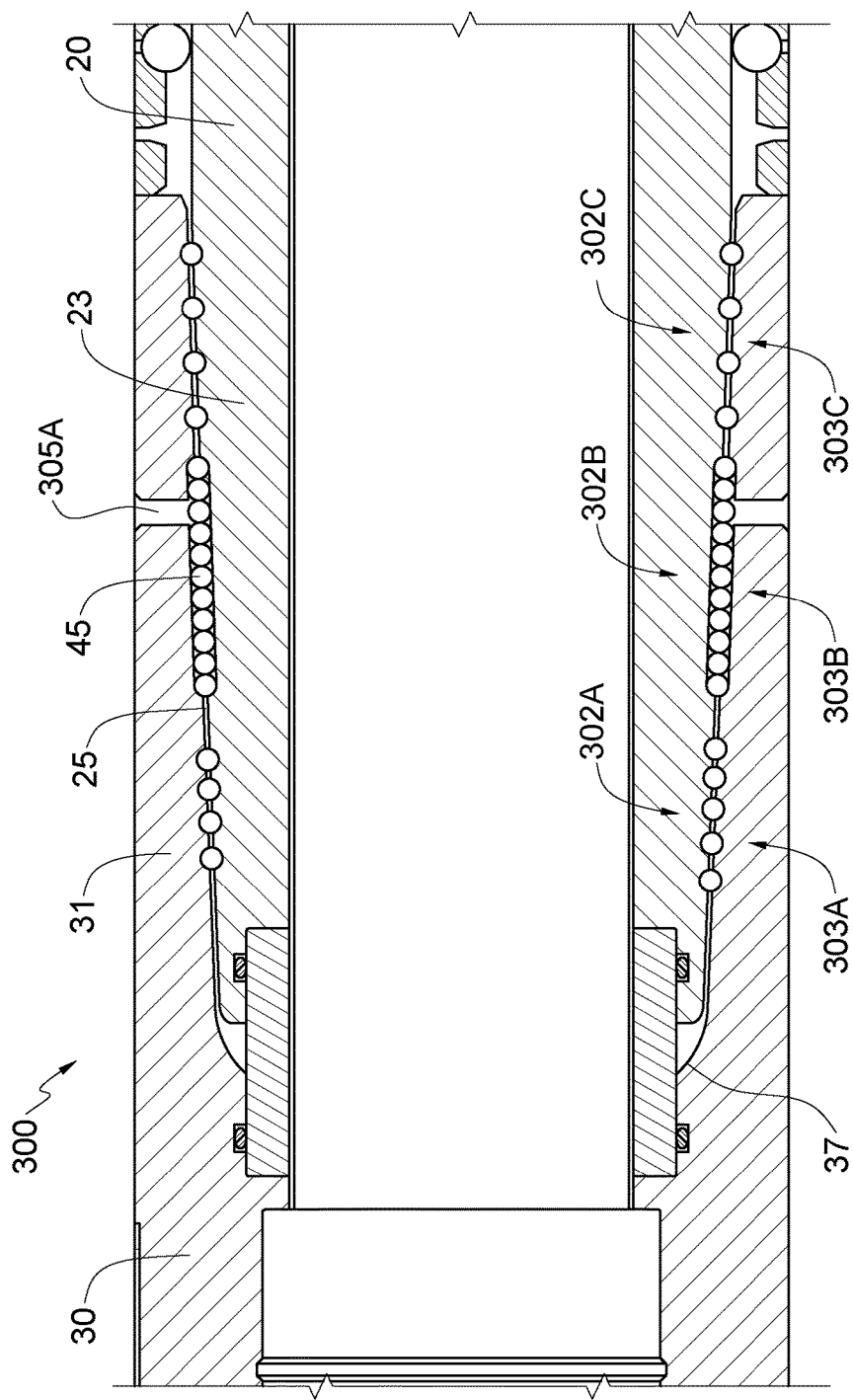
FIG. 18 is a cross sectional view of a connection between a male and a female member according to an example embodiment.
Figure 19:
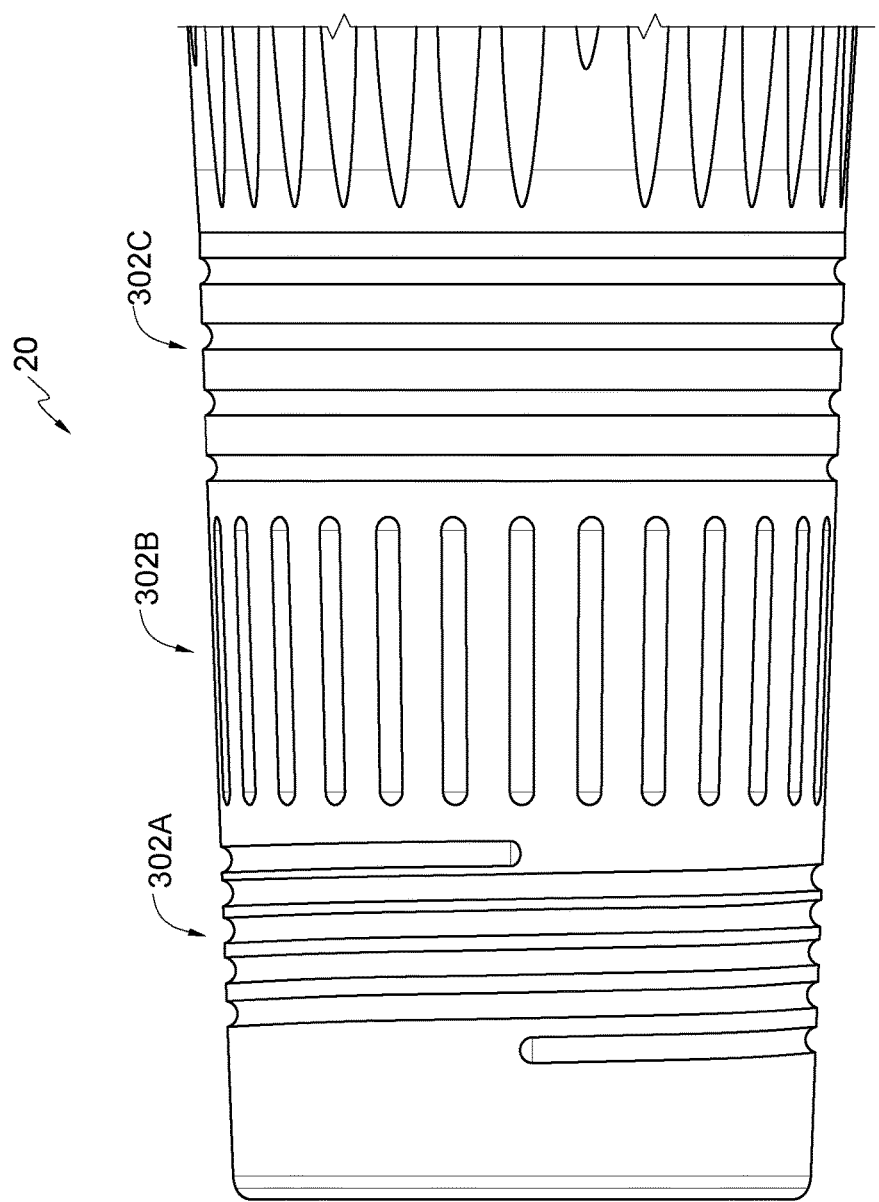
FIGS. 19 and 20 are perspective view of the male and female members, respectively, of the connection in FIG. 18.
Figure 20:
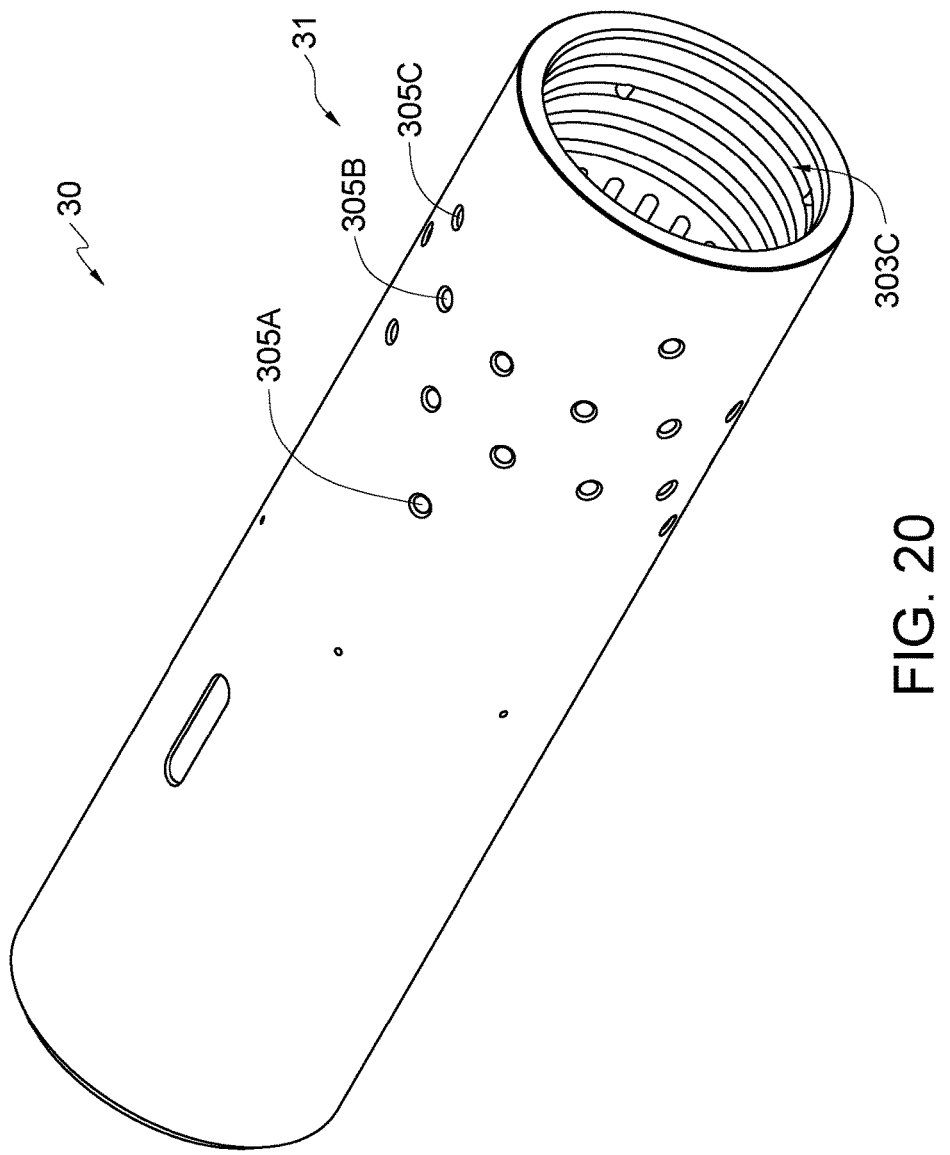

FIGS. 18-20 show a portion of a gap sub 300 according to another example embodiment. Gap sub 300 comprises a male part 20 and a female part 30 which may be substantially as described above. A collar 40 (not shown in FIGS. 18-20) may be supported between shoulders 27, 37 Gap sub 300 provides three sets of grooves 302A, 302B and 302C in the surfaces of mating part 23 of male part 20 and three corresponding sets of grooves 303A, 303B and 303C in the surface of mating part 31 of female part 30.

Grooves 302A and 303A are helical and are configured to receive spheres 45. For example, spheres 45 may be fed into gap 25 where they span between groove 302A and 303A through an opening 305A that may be capped after spheres 45 have been inserted. It can be appreciated that with spheres 45 are in place as described, twisting female part 30 with respect to male part 20 will result in shoulder 37 moving relative to shoulder 27. Thus, collar 40 may be axially compressed between shoulders 27 and 37 by such rotation.

Grooves 302B, 302C, 303B and 303C may be used to secure male part 20 in the mated relationship relative to female part 30. Circumferential grooves 302B and 303B may be located so that a groove 302B is axially aligned with the corresponding groove 303B when collar 40 has been preloaded in compression to a desired degree. With grooves 302B and 303B so aligned, spheres 45 may be introduced into space 25 such that each sphere spans between a groove 302B and the corresponding groove 303B. The spheres 45 may be introduced, for example, by way of openings 305B that may be plugged after the spheres are in place.

Similarly, male piece 20 and female piece 30 may be rotated relative to one another to achieve angular alignment of each groove 302C with a corresponding one of grooves 303C. When this alignment has been achieved, spheres may be introduced into space 25 such that each sphere spans between a groove 302C and the corresponding groove 303C. The spheres 45 may be introduced, for example, by way of openings 305C that may be plugged after the spheres are in place.

Figure 21:
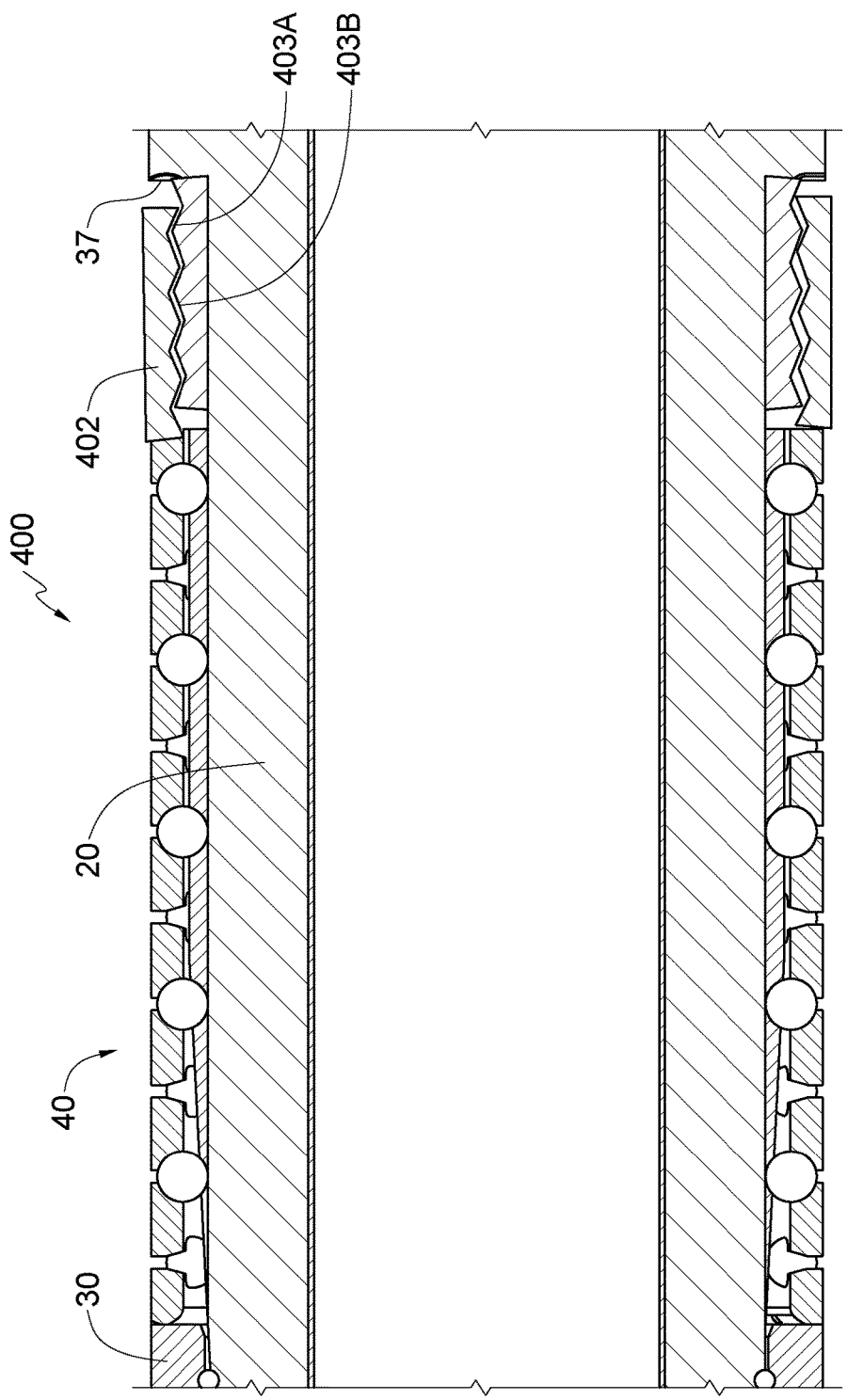
FIG. 21 is a cross section view of a connection between a male and a female member with a compression collar.

FIG. 21 illustrates a portion of a gap sub 400 according to a still further example embodiment. Gap sub 400 comprises a male part 20 and a female part 30 which may be substantially as described above. A collar 40 is supported between shoulders 27, 37. An axially-movable compression collar 402 is mounted on male part 20 adjacent to collar 40. Compression collar 40 may be moved to apply compressive preload to collar 40.

In the illustrated embodiment, compression collar 402 has internal threads 403A that engage threads 403B on male part 20. In this embodiment, compression collar 402 may be advanced toward shoulder 27 by turning compression collar 402 relative to male part 20. Compression collar 402 may have may have holes (not shown) passing through it to facilitate filling both sides of the member with a suitable dielectric material.

Figure 12:
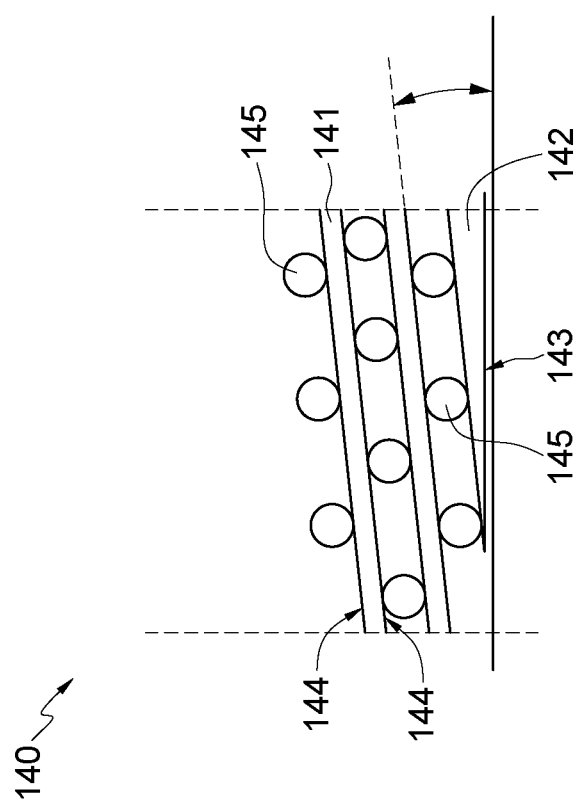
FIG. 12 is a side view of a portion of an insulating collar according to an alternative embodiment.

FIG. 12 shows an insulating collar 140 in accordance with another example embodiment of the invention. Collar 140 comprises a helical spring 141 having two tapered outer rings 142 such that an outer side face 143 of the helical spring 141 lies flat against the male and female shoulders 27, 37 of the gap sub assembly 100 and inner side faces 144 of the helical spring 141 are angled compared to the outer side face 143. A plurality of spheres 45 are positioned between the inner side faces 144. In an alternative embodiment (not shown) spheres 45 may also be positioned between the outer side faces 143 and the male and female shoulders 27, 37.

In the embodiment shown in FIG. 12, the discrete bodies are spheres 45, however in alternative embodiments the discrete bodies may be of a different geometrical shape, for example, but not limited to, cuboids, cube, cylinder or egg shaped bodies. The spheres 45 may be secured in place as a result of being received in depressions on the surface of inner side faces 144 (not shown) or by some alternative means such as with an adhesive, as discussed above in connection with FIGS. 5 to 11. The surface depressions may be provided as a result of the helical spring having undulating inner side faces as discussed with respect to the embodiment shown in FIG. 11.

In alternative embodiments (not shown) the rings of the helical spring 141 may not be circular and could for example be oval, square, or slit rings. The rings may also be double rings. Other innovative aspects of the invention apply equally in embodiments such as these.

The injection step is carried out to inject dielectric material in any spaces in the collar 140 and the collar is assembled on the gap section 22 either before or after the injection step as discussed above in connection with FIGS. 5 to 11.

In one embodiment, the helical spring 141 may be made of a metal or metal alloy for example, but not limited to, copper, copper alloys, aluminium or stainless steel and the spheres 45 are made of an electrical insulator material, for example, but not limited to, ceramic, plastic, plastic coated metals, composite or carbides. In this embodiment, the conductive helical spring 141 must be electrically isolated from the male and female shoulders 27, 37 in some way, for example, but not limited to, having a plastic coating on the outer side faces 143 of the helical spring 141, positioning spheres 45 between the outer side faces 143 of the helical spring 141 and the male and female shoulders 27, 37, positioning electrical insulator wedges (not shown) or the like between the outer side faces 143 of the helical spring 141 and the male and female shoulders 27, 37, injecting dielectric material between the outer side faces 143 of the helical spring 141 and the male and female shoulders 27, 37, or any combination thereof. In an alternative embodiment, the helical spring 141 is made of an electrical insulator material, for example, but not limited to plastic and the spheres 45 are made of a metal or metal alloy.

Figure 13:
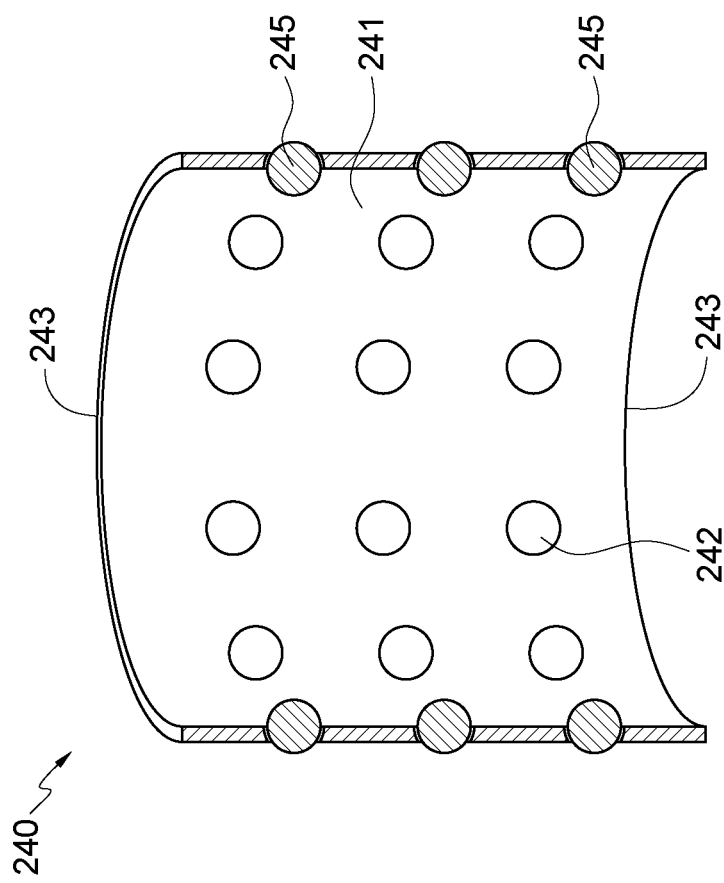
FIG. 13 is a cross sectional cut view of an insulating collar according to an alternative embodiment.
Figure 14:
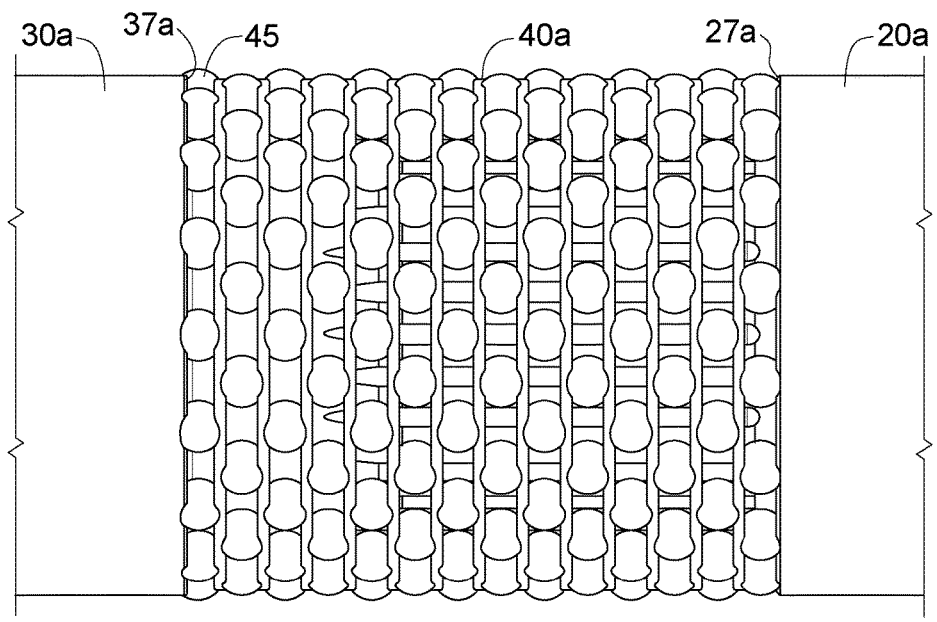
FIG. 14 is a cross sectional partial view of a gap sub assembly according to a second embodiment.
Figure 15A:
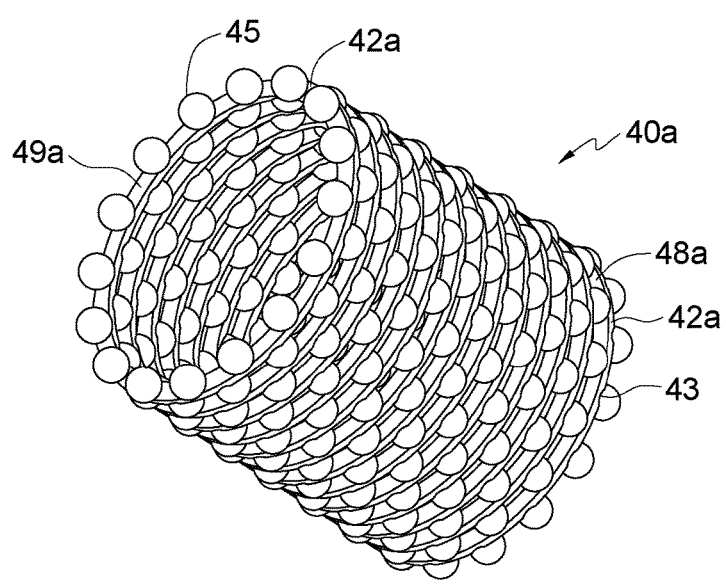
FIGS. 15A, 15B, and 15C are a perspective view of an insulating collar, a perspective partial view of a female member, and a perspective partial view of a male member respectively of the gap sub assembly of FIG. 14.
Figure 15B:
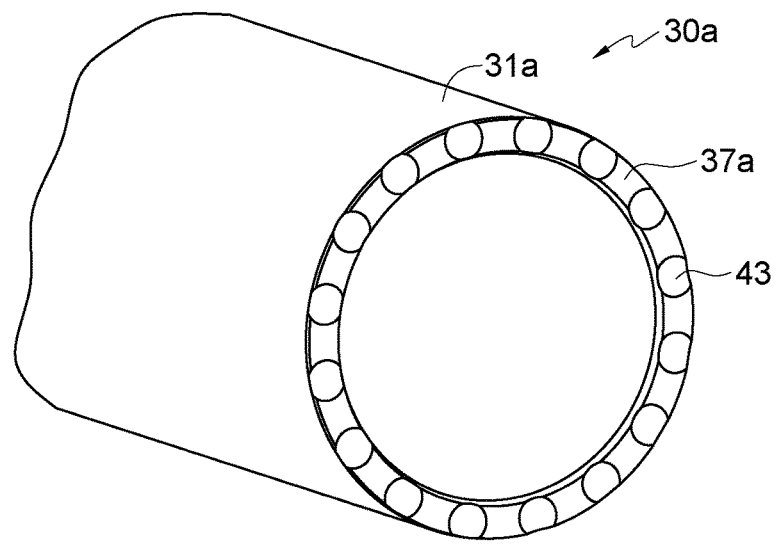
Figure 15C:
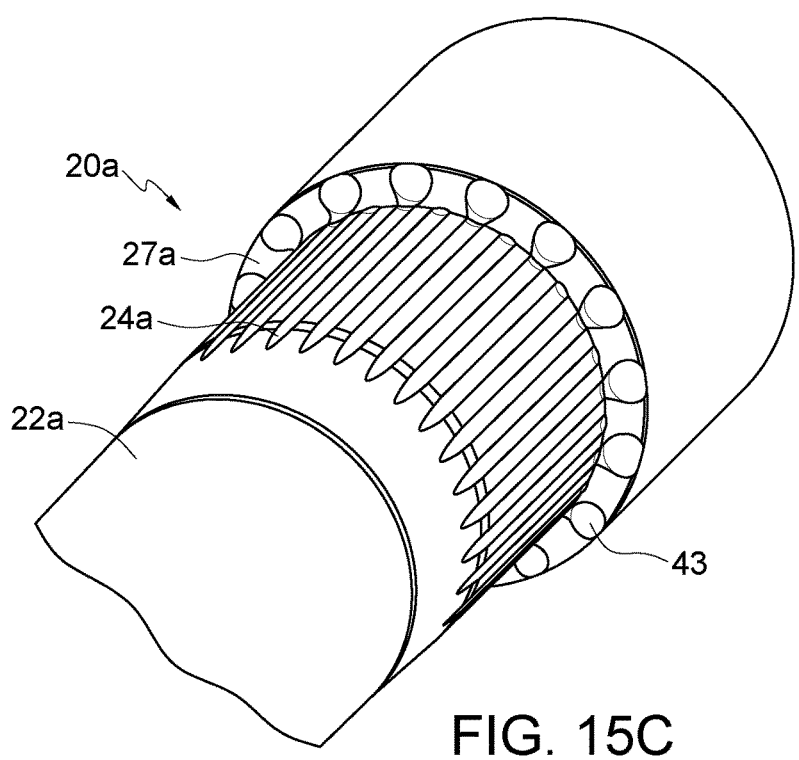

FIG. 13 shows an insulating collar 240 in accordance with another example embodiment of the invention. Collar 240 comprises a cylindrical sleeve 241 including a plurality of holes 242 therethrough which are configured to receive a plurality of spheres 45. Spheres 45 may be secured in the holes 242 by an adhesive. Additionally, or alternatively, a dielectric material may be injected to surround the sleeve 241 and the spheres 45 and secure the sphere 45 in place and may fill any gaps between the sleeve and the male and female shoulders 27, 37. In the embodiment shown in FIG. 13, the discrete bodies are spheres 45, however in alternative embodiments the discrete bodies may be of a different geometrical shape, for example, but not limited to, cuboids, cube, cylinder or egg shaped bodies and the holes 242 are shaped to receive the different shaped discrete bodies. In an alternative embodiment (not shown) the holes 242 may have a smaller cross-sectional area than the largest cross-sectional area of the discrete bodies such that only a portion of the discrete body protrudes through the hole. In this embodiment the widest part of the discrete body is positioned between the gap section 22 and the sleeve 241, therefore the discrete bodies cannot pass through the holes 242. The discrete bodies are seated in the longitudinal grooves 24 of the gap section 22 and the sleeve 241 locks the bodies in place within the grooves 24.

In one embodiment, the sleeve 241 may be made of a metal or metal alloy for example, but not limited to, copper, copper alloys, aluminium or stainless steel and the spheres 45 are made of an electrical insulator material, for example, but not limited to, ceramic, plastic, plastic coated metals, composite or carbides. In this embodiment, the conductive sleeve 241 must be electrically isolated from the male and female shoulders 27, 37 in some way, for example, but not limited to, having a plastic coating on outer side faces 243 of the sleeve 241, positioning spheres 45 between the outer side faces 243 of the sleeve 241 and the male and female shoulders 27, 37, positioning electrical insulator wedges or the like between the outer side faces 243 of the sleeve 241 and the male and female shoulders 27, 37, injecting dielectric material between the outer side faces 243 of the sleeve 241 and the male and female shoulders 27, 37, or any combination thereof. In an alternative embodiment, the sleeve 241 is made of an electrical insulator material, for example, but not limited to plastic and the spheres 45 are made of a metal or metal alloy.

In some embodiments, portions of some or all of spheres 45 project radially outward past the external faces of rings 41, 42. In such embodiments the projecting spheres 45 or other shaped discrete bodies therefore act as the first contact impact zone on the external surface of the collar 40, 140, 240. The discrete bodies may also project radially outward from the external surfaces of the male and female members 20, 30. Side impact loading may beneficially be improved as the projected surface of the discrete bodies typically deflect impact stresses more readily than conventional sleeves positioned over the gap section 22 that may crack or chip. The discrete bodies may also provide a higher resistance to fracture and a higher resistance to wear caused by drilling fluid, thereby increasing the resistance potential of the gap sub assembly 100 of the disclosed embodiments compared to conventional gap sub assemblies. The projecting discrete bodies may serve as wear indicators.

In some embodiments, most of spheres 45 (or other discrete bodies) do not project radially past the external surfaces of rings 41, 42. A few spheres 45 may be mounted so that they do project radially past the external surfaces of rings 41, 42. The projecting spheres or other discrete bodies may serve as wear indicators. Where spheres 45 engage longitudinal grooves 24, some spheres 45 may be made to project radially farther than others by making a few of longitudinal grooves 24 shallower than others and/or by providing shallower portions in one or more of the longitudinal grooves. For example, several of longitudinal grooves 24 spaced apart around the circumference of male member 20 may be made shallower than others. In a specific example embodiment, four of grooves 24 angularly spaced apart by 90 degrees from one another are made shallower than the remainder of longitudinal grooves 24.

In some embodiments some or all of discrete bodies (e.g. spheres 45) are recessed below the outermost surfaces of rings 41 and 42. The distance may be selected such that the discrete bodies begin to protrude when the rings have been worn to the point that the gap sub has reached or is approaching its wear limit.

In alternative embodiments (not shown) longitudinal grooves 24 are not present or are replaced with an alternative structural feature to lock the collar 40, 140, 240 in place. For example, the gap section 22 may include individual surface depression which correspond in shape to the discrete bodies of the collar, or the gap section 22 may include surface protrusions which secure the spheres 45 and/or the rings 41, 41a, 41b, 42 of the collar 40 or the rings of the helical spring 141 of the collar 140 and secure it in place to prevent rotation or torsional movement. The collar 40, 140, 240 may additionally or alternatively be secured into place in the gap section 22 using adhesives or plastics.

In the embodiments described herein, the collar 40, 140, 240 comprises a framework which may comprise the rings 41, 41a, 41b, 42 of the embodiments of FIGS. 5 to 11, the helical spring 141 of the embodiment of FIG. 12, or the sleeve 241 of the embodiment of FIG. 13. The framework may be made of a metal or metal alloy, for example, but not limited to, copper, copper alloys, aluminium or stainless steel. Alternatively, or additionally the framework may be made of an insulator material, such as plastic, or a plastic coated metal, or a dielectric non-conductive material such as epoxy or thermoplastic. In some embodiments, exterior faces of rings 41, 41a, 41b, 42 have a hardness of at least Rc 20, 40, 50, 55, 60, 65, 67, or 69.

The discrete bodies may be made of a metal or metal alloy, for example, but not limited to, copper, copper alloys, aluminium or stainless steel, or the discrete bodies may be made of an electrical insulator material, for example, but not limited to, ceramic, plastic, plastic coated metals, composite or carbides. Exemplary ceramics include, but are not limited to, zirconium dioxide, yttria tetragonal zirconia polycrystal (YTZP), silicon carbide, or composites. In one embodiment, the discrete bodies are made of an insulator material and the framework is made of a metal or metal alloy and/or an insulator material, however in an alternative embodiment, the framework is made of an insulator material and the discrete bodies are made of a metal or metal alloy, and/or an insulator material. In such embodiments when the collar is positioned in the gap section 22 it electrically isolates the male shoulder 27 from the female shoulder 37. It may be beneficial to have the discrete bodies made of an insulator material as the protruding portion of the discrete bodies is in contact with the gap section 22 thereby further electrically isolating the collar 40, 140, 240 from the gap section 22. It may also be beneficial to have at least part of the framework made of a metal or metal alloy to increases the resistance, strength and structural stability of the collar 40, 140, 240 compared to known collars made of non-conductive material such as plastic.

The geometry of the collar 40, 140, 240 may allow for determination of downhole wear characteristics of the gap sub assembly 100 following each successive use of the MWD downhole system as the wear rates between the discrete bodies, and other materials of the collar 40, 140, 240 can be calculated and extrapolated. More specifically, as the surface of the discrete bodies project above the external and internal surface of the rest of the collar 40, 140, 240, the discrete bodies act as a wear indicator following each successive use of the MWD downhole system. Better understanding of downhole wear characteristics may result in better planning and greater confidence in the deployment of older or used tools. The downhole wear characteristics can also be used to determine when the gap sub assembly 100 has reached the end of its life.

The collar 40, 140, 240 beneficially may provide mechanical strength, structure, stiffness and durability to the gap section 22 and restricts bending of the gap section 22. The gap section 22 can therefore be longer than corresponding gap sections of conventional gap sub assemblies. The downhole EM signal efficiency and signal reception of the EM signal at the surface may therefore be increased as a result of the larger gap section 22. Use of the insulating collar 40, 140, 240 of the disclosed embodiments may increase, amongst other things, the overall bending strength, stiffness, torsion strength and toughness of the gap sub assembly 100. As the gap sub can be one of the weakest links in the drill string, this results in greater longevity, reliability and confidence of the EM tool. The collar 40 is typically able to withstand high temperatures as the structural components of the collar 40, 140, 240 can withstand higher temperatures than injectable thermoplastic and/or epoxies of conventional collars. The collar 40, 140, 240 is easy to manufacture and assemble, thereby minimizing manufacturing and production costs. In some of the embodiments disclosed, the amount of dielectric material which needs to be injected in the spaces between the discrete bodies is reduced compared to a conventional solid dielectric sleeve, which may lead to reduced manufacturing costs, and improved life of the tool.

A number of variations are possible. For example, ceramic rings could be provided in collar 40 in place of spheres 45 in some embodiments.

Another aspect provides methods for making gap subs. A method according to an example embodiment comprises placing a collar around a tubular gap portion and coupling the gap portion to at least one other part to yield an assembly wherein the collar is located between first and second shoulders. The method then axially compresses the collar and fills spaces in the collar with a dielectric material while the collar remains axially compressed.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those of skill in the art. The invention in its broader aspects is therefore not limited to the specific details, representative apparatus and methods, and illustrative examples shown and described.

Certain modifications, permutations, additions and sub-combinations thereof are inventive and useful and are part of the invention. It is therefore intended that the following appended claims and claims hereafter introduced are interpreted to include all such modifications, permutations, additions and sub-combinations as are within their true spirit and scope.

Interpretation of Terms

Unless the context clearly requires otherwise, throughout the description and the claims:
"comprise," "comprising," and the like are to be construed in an inclusive sense, as opposed to an exclusive or exhaustive sense; that is to say, in the sense of "including, but not limited to".
"connected," "coupled," or any variant thereof, means any connection or coupling, either direct or indirect, between two or more elements; the coupling or connection between the elements can be physical, logical, or a combination thereof.
"herein," "above," "below," and words of similar import, when used to describe this specification shall refer to this specification as a whole and not to any particular portions of this specification.
"or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "vertical," "transverse," "left," "right," "front," "back"," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g., an assembly, ring, body, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A gap sub comprising:
   a first end comprising a first coupling and a second end comprising a second coupling, the first and second ends attached to and electrically insulated from one another;
   a reduced-diameter section extending between and connecting the first and second ends; and
   a collar extending circumferentially around and along the reduced-diameter section, the collar comprising:
   a plurality of metal rings, the plurality of metal rings being axially spaced apart from one another and radially spaced from the reduced-diameter section by electrically-insulating bodies disposed between adjacent ones of the plurality of rings; and
   a dielectric material filling voids between the metal rings.

2. A gap sub according to claim 1 wherein the electrically-insulating bodies comprise ceramic spheres.

3. A gap sub according to claim 1 wherein one or more ring of the plurality of rings has a side face formed such that an axial spacing between the one or more ring and an adjacent one of the plurality of rings increases with distance from an exterior face of the ring.

4. A gap sub according to claim 1 wherein one or more ring of the plurality of rings has a cross section formed such that the cross section becomes narrower toward the center of the ring.

5. A gap sub according to claim 4 wherein side faces of the one or more ring is beveled.

6. A gap sub according to claim 1 wherein the plurality of rings have side faces formed to provide recesses and the electrically-insulating bodies are engaged with the recesses.

7. A gap sub according to claim 6 wherein the plurality of rings have undulating side faces and the undulating side faces provide the recesses.

8. A gap sub according to claim 6 wherein in at least some of the plurality of rings the recesses on a first side face of the ring are angularly offset from the recesses on a second side face of the ring opposed to the first side face.

9. A gap sub according to claim 1 comprising first and second shoulders respectively at first and second ends of the reduced-diameter portion wherein the collar is preloaded in compression to bear against the first and second collars with a preload pressure.

10. A gap sub according to claim 9 comprising a plurality of wedges configured to provide the preload pressure by being inserted between the first shoulder and the collar and/or the second shoulder and the collar.

11. A gap sub according to claim 9 wherein the first and second couplings comprise first and second threaded couplings, and wherein the first and second threaded couplings are configured to provide the preload pressure by drawing the male shoulder toward the female shoulder when the first end is turned relative to the second end.

12. A gap sub according to claim 9 comprising one or more chords extending across the collar, wherein the chords are configured to provide the preload pressure.

13. A gap sub according to claim 9 comprising an annular member adjacent to either the first shoulder or the second shoulder and extending circumferentially around the reduced diameter section, wherein the annular member comprises a threaded portion that engages a corresponding threaded portion on the reduced diameter section, and wherein the annular member is configured to provide the preload pressure when the annular member is turned relative to the reduced diameter section.

14. A gap sub according to claim 13 wherein there are one or more holes passing through the annular member configured to facilitate filling the areas on both sides of the annular member with a dielectric material.

15. A gap sub according to claim 9 wherein one of the first and second shoulders is coupled for axial movement along the reduced-diameter section.

16. A gap sub according to claim 9 wherein the preload pressure is at least 500 psi.

17. A gap sub according to claim 1 wherein the first and second couplings comprise a threaded coupling.

18. A gap sub according to claim 1 wherein the first and second couplings comprise a pinned coupling.

19. A gap sub according to claim 18 wherein the pined coupling comprises a plurality of pins, each of the plurality of pins inserted into one of a plurality of apertures in the first end and one of a plurality of bores in the second end.

20. A gap sub according to claim 19 wherein at least a first one of the plurality of pins is non-conductive.

21. A gap sub according to claim 19 wherein at least a second one of the plurality of pins is conductive.

22. A gap sub according to claim 21 wherein the second one of the plurality of pins is electrically coupled to the first end and electrically insulated from the second end.

23. A gap sub according to claim 21 wherein the second one of the plurality of pins is electrically coupled to the second end, and electrically insulated from the first end.

24. A gap sub according to claim 1, wherein the first and second couplings comprise a pinned coupling, wherein the pinned coupling comprises a plurality of pins extending out of the first end into a corresponding plurality of bores in the second end.

25. A gap sub according to claim 24 wherein the plurality of pins are electrically conductive, and wherein an insulating material prevents the plurality of pins from directly touching the second end.

26. A gap sub according to claim 1 wherein:
the first coupling comprises a first plurality of grooves on the exterior surface of the reduced-diameter section;
the second coupling comprises a second plurality of grooves on the interior surface of a bore of the second end;
the first end is coupled to the second end by a plurality of coupling bodies; and
each of the plurality of coupling bodies extends into one of the first plurality of grooves and extends into one of the second plurality of grooves.

27. A gap sub according to claim 26 wherein:
at least one of the first plurality of grooves comprises a first longitudinal groove that extends longitudinally along the exterior surface of the reduced-diameter section;
at least one of the second plurality of grooves comprises a second longitudinal groove that extends longitudinally along the interior surface of the bore of the second end; and
at least a first one of the plurality of coupling bodies extends into both the first longitudinal groove and the second longitudinal groove to resist relative rotational movement of the first end and the second end.

28. A gap sub according to claim 26 wherein:
at least one of the first plurality of grooves comprises a first circumferential groove that extends circumferentially around the exterior surface of the reduced-diameter section;
at least one of the second plurality of grooves comprises a second circumferential groove that extends circumferentially around the interior surface of the bore of the second end; and
at least a second one of the plurality of coupling bodies extends into both the first circumferential groove and the second circumferential groove to resist relative longitudinal movement of the first end and the second end.

29. A gap sub according to claim 26 wherein:
at least one of the first plurality of grooves comprises a first helical groove that extends helically around the exterior surface of the reduced-diameter section;
at least one of the second plurality of grooves comprises a second helical groove that extends helically around the interior surface of the bore of the second end; and
at least a third one of the plurality of coupling bodies extends into both the first helical groove and the second helical groove.

30. A gap sub according to claim 26 wherein the plurality of coupling bodies comprise spheres.

31. A gap sub according to claim 1 comprising a third plurality of grooves extending longitudinally along the reduced-diameter section wherein the electrically-insulating bodies extend into the third plurality of grooves.

32. A method for making a gap sub, the method comprising:
placing a collar around a tubular gap portion wherein the collar comprises a plurality of rings extending circumferentially around the gap portion and a plurality of electrically-insulating bodies;
placing the electrically-insulating bodies between adjacent ones of the plurality of rings to space the plurality of rings apart from one another;
coupling the gap portion to at least one other part to yield an assembly wherein the collar is located between first and second shoulders;
axially compressing the collar;
filling spaces in the collar with a dielectric material.

33. A method according to claim 32 wherein the collar comprises a plurality of electrically-insulating bodies and the method comprises placing the bodies to support the rings radially spaced-apart from the gap portion.

34. A method according to claim 33 wherein the electrically-insulating bodies comprise spheres and the method comprises engaging the spheres in corresponding recesses in side faces of the rings.

35. A method according to claim 33 comprising arranging the electrically-insulating bodies to contact the rings at circumferentially spaced-apart locations.

36. A method according to claim 35 comprising contacting one or more of the rings with the electrically-insulating bodies such that the electrically-insulating bodies contact one side face of the ring at locations that are angularly offset from locations at which an opposing side face of the ring is contacted by the electrically-insulating bodies.

37. A method according to claim 35 comprising contacting one or more of the rings with the electrically-insulating bodies such that the electrically-insulating bodies contact one side face of the ring at locations which are angularly aligned with locations at which an opposing side face of the ring is contacted by the electrically-insulating bodies.

38. A method according to claim 32 wherein compressing the collar comprises moving the gap portion axially relative to the other part.

39. A method according to claim 32 wherein compressing the collar comprises inserting wedges between the collar and one or more of the first and second shoulders.

40. A method according to claim 32 wherein compressing the collar comprises advancing an annular member to compress the collar against the first shoulder.

41. A method according to claim 40 wherein the annular member is in threaded engagement with the gap portion and advancing the annular member comprises rotating the annular member relative to the gap portion.

42. A method according to claim 41 comprising filling a gap between the second shoulder and the annular member with the dielectric material after compressing the collar.

* * * * *